(12) United States Patent
Sørensen

(10) Patent No.: US 11,622,555 B2
(45) Date of Patent: Apr. 11, 2023

(54) OPTICAL REMOTE SENSING SYSTEMS FOR AERIAL AND AQUATIC FAUNA, AND USE THEREOF

(71) Applicant: FaunaPhotonics Agriculture & Environmental A/S, Copenhagen SV (DK)

(72) Inventor: Mikkel Brydegaard Sørensen, Lund (SE)

(73) Assignee: FaunaPhotonics Agriculture & Environmental A/S, Copenhagen SV (DK)

( * ) Notice: Subject to any disclaimer, the term of this patent is extended or adjusted under 35 U.S.C. 154(b) by 1153 days.

(21) Appl. No.: 16/094,427

(22) PCT Filed: Apr. 18, 2017

(86) PCT No.: PCT/EP2017/059127
§ 371 (c)(1),
(2) Date: Oct. 17, 2018

(87) PCT Pub. No.: WO2017/182440
PCT Pub. Date: Oct. 26, 2017

(65) Prior Publication Data
US 2019/0124914 A1 May 2, 2019

(30) Foreign Application Priority Data

Apr. 18, 2016 (DK) .......................... PA 2016 00232
Aug. 30, 2016 (DK) .......................... PA 2016 70662

(51) Int. Cl.
*G01C 3/08* (2006.01)
*A01M 31/00* (2006.01)
(Continued)

(52) U.S. Cl.
CPC ......... *A01M 31/002* (2013.01); *A01K 11/006* (2013.01); *A01K 29/00* (2013.01);
(Continued)

(58) Field of Classification Search
CPC .......... A01M 2200/012; A01M 25/006; A01M 31/002; A01M 1/026; A01M 7/0089;
(Continued)

(56) References Cited

U.S. PATENT DOCUMENTS 8,616,052 B1   12/2013   Exelis
9,946,922 B2 *  4/2018   Hyde et al. ........ G06K 9/00362
(Continued)

FOREIGN PATENT DOCUMENTS

AU     693039 B2    6/1998
CN    102340988 A   2/2012
(Continued)

OTHER PUBLICATIONS

International Search Report for International Application No. PCT/EP2017/059127, dated Jul. 24, 2017 (5 pages).
(Continued)

*Primary Examiner* — Mark Hellner
(74) *Attorney, Agent, or Firm* — Nixon Peabody LLP

(57) ABSTRACT

Optical remote sensing systems for quantifying aerial or aquatic fauna with respect to number of living organisms, such as animals, such as insects, birds, bats or aquatic organisms, and to biological specificity.

30 Claims, 12 Drawing Sheets

(51) Int. Cl.
- *A01M 7/00* (2006.01)
- *G01S 17/88* (2006.01)
- *G01S 7/48* (2006.01)
- *G01S 7/481* (2006.01)
- *G01S 7/497* (2006.01)
- *G01S 7/499* (2006.01)
- *G01S 17/46* (2006.01)
- *A01K 11/00* (2006.01)
- *A01M 1/02* (2006.01)
- *G01S 17/86* (2020.01)
- *A01K 29/00* (2006.01)
- *A01M 25/00* (2006.01)

(52) U.S. Cl.
CPC .......... *A01M 1/026* (2013.01); *A01M 7/0089* (2013.01); *A01M 25/006* (2013.01); *G01S 7/4802* (2013.01); *G01S 7/4815* (2013.01); *G01S 7/4816* (2013.01); *G01S 7/497* (2013.01); *G01S 7/499* (2013.01); *G01S 17/46* (2013.01); *G01S 17/86* (2020.01); *G01S 17/88* (2013.01); *A01M 2200/012* (2013.01)

(58) Field of Classification Search
CPC ........ G01S 7/499; G01S 17/88; G01S 7/4802; G01S 17/86; G01S 7/4815; G01S 7/497; G01S 7/481; G01S 7/4816; G01S 7/4814; A01K 29/00; A01K 11/006
See application file for complete search history.

(56) References Cited

U.S. PATENT DOCUMENTS

| | | | |
|---|---|---|---|
| 2002/0175294 A1 | 11/2002 | Services | |
| 2007/0024849 A1 | 2/2007 | Carrig et al. | |
| 2007/0040730 A1 | 2/2007 | Schlotterbeck et al. | |
| 2010/0186284 A1 | 7/2010 | Hyde et al. | |
| 2011/0080311 A1* | 4/2011 | Pushkarsky et al. | G01S 7/38 342/14 |
| 2011/0313721 A1* | 8/2011 | Keshavmurthy et al. | G01B 11/24 702/156 |
| 2013/0096873 A1* | 4/2013 | Rosengaus et al. | G01C 3/00 702/151 |
| 2015/0027040 A1 | 1/2015 | Blue | |

FOREIGN PATENT DOCUMENTS

| | | | | |
|---|---|---|---|---|
| CN | 102523245 A | 6/2012 | | |
| CN | 104266982 A | 1/2015 | | |
| CN | 104597443 A | 5/2015 | | |
| WO | WO9711353 | * 9/1995 | ............ | G01N 21/38 |
| WO | 2006/083349 A2 | 8/2006 | | |
| WO | WO 2008/009536 A1 | 1/2008 | | |
| WO | WO 2009/064626 A1 | 5/2009 | | |
| WO | WO2016/018478 | * 4/2015 | ............... | G01P 5/06 |
| WO | WO2016/210274 | * 6/2015 | ............ | A01M 29/12 |

OTHER PUBLICATIONS

Written Opinion of International Searching Authority for International Application No. PCT/EP2017/059127, dated Jul. 24, 2017 (12 pages).

Brydegaard, M. et al., "Insect monitoring with fluorescence lidar techniques: feasibility study"; Applied Optics, vol. 48, No. 30, pp. 5668-5677; Oct. 12, 2009 (10 pages).

Brydegaard, M.; "Towards Quantitative Optical Cross Sections in Entomological Laser Radar—Potential of Temporal and Spherical Parameterizations for Identifying Atmospheric Fauna"; Plos one, Jan. 1, 2015; p. e0135231; XP0SS389056; retrieved from the Internet: http://journals.plos.org/plosone/article/file?id=10.1371/journal.pone.013523 1&type=printable (15 pages).

Brydegaard, M. et al.; "Realistic Instrumentation Platform for Active and Passive Optical Remote Sensing"; Sage Journals Applied Spectroscopy, vol. 70, No. 2, pp. 372-385; Jan. 15, 2016; XP055389465 (15 pages).

Brydegaard, M. et al.; "Super Resolution Laser Radar with Blinking Atmospheric Particles—Application to Interacting Flying Insects (Invited Paper)"; Progress in Electromagnetics Research, vol. 147, pp. 141-151; Jan. 1, 2014; XP055368766 (11 pages).

Brydegaard, M. et al., "Feasibility study: fuorescence lidar for remote bird classification"; Applied Optics, Optical Society of America, vol. 49, No. 24, pp. 4531-4544; Aug. 20, 2010; XP001556809 (15 pages).

Lundin, P. et al.; "Remote nocturnal bird classification by spectroscopy in extended wavelength ranges"; Applied Optics, Optical Society of America, vol. 50, No. 20, pp. 3396-3411; Jul. 10, 2011; XP001564198 (16 pages).

Alem, G. et al.; "Investigation of atmospheric insect wing-beat frequencies and iridescence features using a multi-spectral kHz remote detection system"; Optomechatronic Micro/Nano Devices and Components III: Oct. 8-10, 2007, Lausannce, Switzerland, SPIE, Bellingham, Washington; vol. 9221, pp. 922106-922106; Oct. 8, 2014; XP060039855 (15 pages).

Muirhead-Thomson, R. C ; "Trap responses of flying insects: The influence of trap design on capture efficiency" Academic Press (1991) (297 pages).

* cited by examiner

OPTICAL REMOTE SENSING SYSTEMS FOR AERIAL AND AQUATIC FAUNA, AND USE THEREOF

CROSS-REFERENCE TO RELATED APPLICATIONS

This application is a U.S. National Stage of International Application No. PCT/EP2017/059127, filed Apr. 18, 2017, which claims the benefit of Denmark Patent Application No. PA201600232, filed Apr. 18, 2016, and Denmark Patent Application No. PA201670662, filed Aug. 30, 2016, all of which are incorporated herein by reference in their entireties.

FIELD

The present disclosure relates to the field of aerial and aquatic fauna, in particular, to optical remote sensing, known as LIDAR (Light Detection and Ranging). Improved LIDAR systems and methods are provided for measuring, quantifying, monitoring, classifying, specifying, surveying, predicting, forecasting, investigating, and/or warning against aerial and/or aquatic fauna, e.g. for use in a number of fields and applications, such as agronomics, malaria control, windmill parks, aquaculture production, e.g. fish farms, and science, e.g. entomology, ornithology, biogeography, oceanography.

BACKGROUND

Atmospheric fauna comprises insects that play a crucial role in the earth's ecosystem and influence mankind in multiple ways; including as pollinators for food production, as pests that can have a devastating effect on agriculture, and as mosquitoes and biting midges that can transmit deadly diseases to humans and livestock.

To study insects, the traditional method is using traps in which insects are caught for subsequent inspection and analysis. Various types of traps are used and the trap method has for decades been the preferred method for entomologists to determine insect information, such as species, gender, age classification, micromorphology, and dietary information. The method, however, is highly laborious, time-consuming and costly per insect. Hence, the numbers of insects that can be studied are limited to the number of insects that may be trapped (typically in the single to tens, or low hundreds), the available resources (man-power), or the accessibility of the area/atmospheric region of interest. Furthermore, many trapping methods are known to be biased and perturbing (Muirhead-Thomson R, Trap responses of flying insects: The influence of trap design on capture efficiency, Academic Press (1991)).

To overcome the limitations of traditional traps, LIDAR systems have been proposed, see for example Brydegaard Sørensen, Mikkel LU; Guan, Zuguang LU; Wellenreuther, Maren LU and Svanberg, Sune LU (2009) In Applied Optics 48(30). p. 5668-5677). Such LIDAR systems for aerial fauna have been the subject of significant research and comprise a laser beam that is transmitted into the atmosphere and a receiver/detector that measures the backscattered laser light from insects. The systems are capable of counting the number events, where an insect intersects with the laser beam. Due to the long range of laser beam, large atmospheric regions may be analysed for aerial fauna. Hence, the systems are capable of counting a large number of insects, such as in the tens to hundreds of thousands, and even up to millions.

SUMMARY

It is an object to provide an optical remote sensing system, use thereof and methods to quantify biological specificity in aerial and aquatic environments, such as of insects, birds, bats and aquatic organisms.

It is an object to provide methods that improve and/or reduce use of pesticides and chemicals in agriculture and aquaculture productions.

In particular, it is an object to quantify aerial insect fauna associated with land use, farming regimes and crop type in agricultural landscapes.

It is an object to provide new means for pest control, and for information in relation to pollinators.

It is an object to provide a system for control, warning and/or combat of vector-borne diseases, such as malaria, yellow fever, zika virus, HAT and AAT sleeping sickness, Chikungunya virus, Dengue fever, West Nile virus, etc.

The above-mentioned and other objects are fulfilled by a LIDAR system for analysing fauna, comprising at least one source of electromagnetic radiation that is adapted for emission of electromagnetic radiation towards a measurement volume for illumination of animals in the measurement volume, at least one detector of electromagnetic radiation that is arranged for provision of at least one output signal in response to reception of electromagnetic radiation having interacted with the animals in the measurement volume, and a processor that is adapted for detecting animals in the measurement volume based on the at least one output signal.

The processor may further be adapted for counting detected animals.

The processor may further be adapted for determination of at least one parameter of the received electromagnetic radiation relating to the species of the detected animals.

The processor may further be adapted for comparison of the determined at least one parameter with a set of reference data for different species and for generation of information on biological specificity of the animals based on the comparison.

The comparison may include comparison of a distribution of values of the at least one parameter with a corresponding distribution of values of the set of reference data.

The comparison may include utilization of regression analysis, such as linear regression analysis.

The comparison may include utilization of clustering.

The comparison may include formation of histograms of values of the determined at least one parameter and formation of histograms of values of the at least one parameter of the set of reference data and comparison of one of more of the formed histograms of the determined at least one parameter with respective one or more formed histograms of the at least one parameter of the set of reference data.

For example, the set of reference data may include wing beat frequencies of various species of male and female mosquitoes obtained under laboratory conditions. Typically, male and female mosquitoes of the same species have different wing beat frequencies. The wing beat frequencies are obtained by releasing a number of individuals of the same sex and type and determining their wing beat frequencies with a laboratory LIDAR system sequentially for a number of types of mosquitoes. Histograms of wing beat frequencies may then be formed for male mosquitoes of each species and for female mosquitoes of each species. A histogram of all wing beat frequencies determined in the field may then be compared with the previously determined histograms of wing beat frequencies for each sex and each species for identification of possible presence of the respective sex and species in the determined field data.

The measurement volume is a volume in space that is illuminated by the at least one source of electromagnetic radiation and that resides in a viewing field of the at least one detector.

The measurement volume may have a diameter ranging from 5 cm to 20 cm, such as from 8 cm to 15 cm. One end of the measurement volume may be located within a distance of 1 m from the at least one source of electromagnetic radiation of the LIDAR system, and the other end of the measurement volume may be located 1 km from the at least one source of electromagnetic radiation. For example, the measurement volume may have a diameter of 12 cm with one end of the measurement volume located 30 m from the at least one source of electromagnetic radiation and the other end of the measurement volume located 200 m from the at least one source of electromagnetic radiation.

When an object, such as an animal, e.g. an insect, is in the measurement volume, it is illuminated by and scatters the electromagnetic radiation. A part of the scattered radiation propagates towards the at least one detector that outputs the at least one output signal in response to reception of the scattered electromagnetic radiation so that the animal in the measurement volume can be detected.

In the following, reception of scattered electromagnetic radiation from an animal in the measurement volume is termed an event.

Only rarely will two animals be present in the measurement volume simultaneously so that scattered electromagnetic radiation is received by the at least one detector from one animal at the time.

Some of the LIDAR systems disclosed in the following, such as a LIDAR system wherein the at least one detector comprises a linear CCD or CMOS array arranged in accordance with the Scheimpflug principle as further disclosed in the following, can distinguish scattered electromagnetic radiation from individual animals also when more than one animals are in the measurement volume simultaneously.

The received scattered electromagnetic radiation contains information about the animal that has scattered the electromagnetic radiation. The processor of the LIDAR system is adapted to extract at least part of the information from the received scattered electromagnetic radiation by the determination of the at least one parameter of the received electromagnetic radiation relating to the animal that has scattered the electromagnetic radiation.

The LIDAR system may comprise a processor unit with the processor.

The LIDAR system may comprise a processor unit with a processor housing accommodating the processor.

The LIDAR system may comprise a transmitter unit with the at least one source of electromagnetic radiation.

The LIDAR system may comprise a transmitter unit with a transmitter housing accommodating the at least one source of electromagnetic radiation.

The LIDAR system may comprise a receiver unit with the at least one detector of electromagnetic radiation.

The LIDAR system may comprise a receiver unit with a receiver housing accommodating the at least one detector of electromagnetic radiation.

The At Least One Source

The at least one source of electromagnetic radiation may emit radiation in the Near-Infrared (NIR) range, e.g. having wavelengths ranging from 750 nm to 1400 nm.

The at least one source of electromagnetic radiation may emit radiation in the Short-Wavelength Infrared (SWIR) range, e.g. having wavelengths ranging from 1400 nm to 3000 nm.

The at least one source of electromagnetic radiation may comprise one or more lasers, e.g. including a continuous wave laser, for emission of respective one or more beams of electromagnetic radiation.

The at least one source of electromagnetic radiation may comprise at least one, such as at least two lasers, for emission of electromagnetic radiation of respective at least two different centre wavelengths w1, w2, . . . , wn.

Preferably, w1 and w2 are separated by at least 100 nm. For example, w1 and w2 may be near-infrared wavelengths for eye-safety reasons, for example w1 may be equal to, or approximately equal to 808 nm, and w2 may be equal to, or approximately equal to 980 nm; or, w1 may be equal to, or approximately equal to 980 nm, and w2 may be equal to, or approximately equal to 1550 nm.

The at least one source of electromagnetic radiation may comprise a laser emitting radiation at a plurality of frequencies, such as a fundamental frequency and a plurality of harmonics, such as first, second, and third harmonics.

The at least one source of electromagnetic radiation may comprise two separate continuous wave (CW) lasers.

The at least one source of electromagnetic radiation, e.g. of the transmitter unit, may comprise a diode laser, an array of diode lasers, a supercontinuum source, etc. A supercontinuum source may be obtained from commercial vendors, such as Eagleyard Photonics GmbH or NKT Photonics A/S.

The at least one source of electromagnetic radiation may be arranged for emission of electromagnetic radiation of at least two different polarization states p1, p2.

The at least one source of electromagnetic radiation may include a diode laser, e.g. a diode laser with an output power in the range from 100 mW to 3 W.

The At Least One Detector

The at least one detector is arranged for reception of electromagnetic radiation having interacted with the animal in the measurement volume, and may also be arranged for detection of direction of movement of the animal through the measurement volume.

The at least one detector may include a quadrant detector wherein each quadrant provides an output signal in response to reception of electromagnetic radiation enabling detection of direction of movement of an animal through the measurement volume based on the timing of the output signals from each quadrant.

The at least one detector may also capable of resolving wing-beat frequency provided that the sampling frequency is above 2 kHz, such as above 3 kHz, etc., since the fundamental wing-beat frequency of insects is at most 1 kHz. For example, the sampling frequency may be 3 kHz.

The LIDAR system may comprise at least one first detector of the at least one detector of electromagnetic radiation that is arranged for reception of backscattered electromagnetic radiation from the measurement volume.

The LIDAR system may comprise at least one second detector of the at least one detector of electromagnetic radiation that is arranged for reception of electromagnetic radiation from the measurement volume from a first angle different from the direction; i.e. the forward or backward direction, of propagation of the electromagnetic radiation emitted by the at least one source of electromagnetic radiation, e.g. in accordance with the Scheimpflug principle.

The LIDAR system may comprise at least one third detector of the at least one detector of electromagnetic radiation that is arranged for reception of electromagnetic radiation from the measurement volume from a second angle different from the direction; i.e. the forward or backward direction, of propagation of the electromagnetic radiation emitted by the at least one source of electromagnetic radiation and different from the first angle, e.g. in accordance with the Scheimpflug principle.

The at least one detector of electromagnetic radiation may comprise a semiconductor detector, such as a Silicium (Si) detector, such as a Si quadrant detector, for example a Si detector suitable for detection of electromagnetic radiation ranging from 0.19 µm to 1 µm. The Si detector is also capable of resolving wing-beat frequency provided that the sampling frequency is above 2 kHz, such as 3 kHz and above 3 kHz, since the fundamental wing-beat frequency of insects is at most 1 kHz.

The at least one detector of electromagnetic radiation may comprise an Indium-Gallium-Arsenide (InGaAs) detector, e.g. an InGaAs quadrant detector, e.g. for detection of electromagnetic radiation ranging from 0.9 µm to 1.7 µm.

The InGaAs detector may also be capable of resolving wing-beat frequency provided that the sampling frequency is above 2 kHz, such as 3 kHz and above 3 kHz, since the fundamental wing-beat frequency of insects is at most 1 kHz.

The at least one detector of electromagnetic radiation may comprise an array of detectors, such as a two-dimensional array of detectors, a linear array of detectors, etc., e.g., a two-dimensional CCD or CMOS array, or a linear CCD or CMOS array, such as a linear CCD or CMOS array with 2048 pixels, wherein each of the detectors, also denoted pixels, of the CCD or CMOS array is arranged for reception of electromagnetic radiation from a specific part of the measurement volume, e.g. in accordance with the Scheimpflug principle.

Each detector of a CCD or CMOS array charges a capacitor in response to the intensity of electromagnetic radiation received by the detector, i.e. the electromagnetic radiation incident upon it, so that at each point in time the amount of charge of the capacitor corresponds to the integrated intensity of the electromagnetic radiation received by the detector in question. The entire set of charges of capacitors of the CCD or CMOS array is output at regular intervals and denoted a frame. Upon read-out of the capacitor charge values, the capacitors are reset to zero charge.

Optics

The LIDAR system may comprise a first optical system arranged for cooperation with the least one first detector for reception of backscattered electromagnetic radiation from the measurement volume.

The LIDAR system may comprise a second optical system arranged for cooperation with the at least one second detector in accordance with the Scheimpflug principle for reception of electromagnetic radiation from the measurement volume from a first angle different from the direction; i.e. the forward or backward direction, of propagation of the electromagnetic radiation emitted by the at least one source of electromagnetic radiation.

The LIDAR system may comprise a third optical system arranged for cooperation with the at least one third detector of electromagnetic radiation in accordance with the Scheimpflug principle for reception of electromagnetic radiation from the measurement volume from a second angle different from the direction of propagation of the electromagnetic radiation emitted by the at least one source of electromagnetic radiation and different from the first angle of the second optical system.

Preferably, the system is designed according to the Scheimpflug principle and the Hinge rule.

The LIDAR system may comprise at least one imaging system for imaging the measurement volume onto the respective one or more detector surfaces of the at least one detector, e.g., each of the first, second, and third optical systems may comprise at least one imaging system for imaging the measurement volume onto the one or more detector surfaces of the respective at least one first, second, and third detector.

The at least one imaging system may comprise one or more lenses.

The at least one imaging system may comprise one or more image forming mirrors.

The at least one imaging system may comprise one or more diffractive optical elements.

The at least one imaging system may comprise at least one telescope, e.g. including a Newtonian telescope, e.g. a 800 mm Newtonian telescope with a 200 mm diameter, for cooperation with the at least one detector for reception of electromagnetic radiation from the measurement volume.

The at least one imaging system may be coupled with, e.g., Si, InGaAs, etc., detectors, e.g. including a quadrant detector for detection of flight direction from the time series of the respective output signals from each quadrant.

The at least one imaging system may include two detection telescopes arranged with 90 degree mutual separation, an event, i.e. an animal traversing the measurement volume, may be viewed from the side and the top allowing for good reconstruction of the position of the animal within the measurement volume and flight direction may be determined, e.g. by the processor.

The LIDAR system may have two or more detectors, and a dichroic beam splitter positioned in front of the, e.g. two, detectors, e.g. a Si detector, e.g. a Si quadrant detector, for detection of electromagnetic radiation ranging from 0.19 µm to 1 µm; and an InGaAs detector for detection of electromagnetic radiation ranging from 0.9 µm to 1.7 µm. The dichroic beam splitter is adapted to transmit SWIR electromagnetic radiation and reflect NIR electromagnetic radiation. These detectors are also capable of resolving wing-beat frequency provided that the sampling frequency is above 2 kHz, such as 3 kHz and above 3 kHz, since the fundamental wing-beat frequency of insects is at most 1 kHz.

The at least one source of electromagnetic radiation may comprise at least one, such as at least two lasers, for emission of electromagnetic radiation of respective at least two different centre wavelengths w1, w2, . . . , wn, and preferably, the transmitted laser beams of electromagnetic radiation having centre wavelengths w1 and w2 and wn are coinciding, or substantially coinciding, in the measurement volume for illumination of an animal, such as an insect, bird, bat, an aquatic organism, etc., with the same, or substantially the same, spot size and spot centre for different centre wavelengths w1, w2, . . . , wn.

By substantially the same spot size and spot centre is meant that the at least one detector of electromagnetic radiation does not detect signal differences relating to different beam paths of electromagnetic radiation at wavelengths w1 and w2, ..., wn.

A person skilled in the art of optics and photonics would know how to design the at least one source of electromagnetic radiation with two separate wavelengths for illumination of a target/organism with substantially equal spot size and beam centre.

The LIDAR system may comprise transmitter optics arranged for cooperation with the least one source of electromagnetic radiation for emission of the electromagnetic radiation towards the measurement volume.

The transmitter optics may comprise optics for emission of laser light beams of at least two different polarization states p1, p2 that are coinciding, or substantially coinciding, in the measurement volume for illumination of a living organism, such as an insect, bird, bat, an aquatic organism, etc., with the same, or substantially the same, spot size and spot centre for polarization states p1, p2.

The optics may comprise a half-waveplate to provide different beam paths in at least part of the system for beams of different polarization states p1, p2.

The optics may comprise an optical element, wherein the system is designed such that light of p1 or p2 is transmitted through the optical element in the Brewster angle.

The transmitter optics may comprise one or more beam shapers, each of which is adapted for shaping the intensity profile of a respective laser beam into a desired profile, such as a Gaussian intensity profile, a top hat intensity profile, etc.

The one or more beam shapers may comprise an optical fibre adapted for shaping the intensity profile of the beam into a Gaussian beam profile.

The one or more beam shapers may comprise a phase contrast system adapted for shaping the intensity profile of the beam, such as a Gaussian intensity profile, at top hat intensity profile, etc.

The transmitter optics may comprise a bandpass filter cooperating with the at least one detector for suppression of background signals and having a centre wavelength within the wavelength range of the at least one source of electromagnetic radiation.

The transmitter optics may comprise a telescope, such as a 600 mm to 800 mm lens telescope with a 120 mm diameter.

The Processor

The processor may be adapted to count the number of animals, such as the number of insects, detected in the measurement volume over a time period.

The processor may be adapted for controlling the at least one source of electromagnetic radiation and for turning the at least one source of electromagnetic radiation on and off alternatingly.

The processor may be adapted for determination of background emission of electromagnetic radiation from the measurement volume when the at least one source of electromagnetic radiation is turned off.

The processor may be connected to the at least one camera for reception of images from the at least one camera.

The processor may be adapted for performing image analysis of images received from the at least one camera.

The processor may be adapted for controlling the at least one source of electromagnetic radiation in response to the performed analysis.

The processor may be adapted for performing image analysis of images received from the at least one camera for monitoring alignment of the at least one source of electromagnetic radiation and the at least one detector.

The processor may be adapted for monitoring alignment of the at least one source of electromagnetic radiation and the at least one detector based on the at least one output signal from the at least one detector without an animal in the measurement volume.

The processor may be adapted for monitoring objects, e.g. humans, proximate the electromagnetic radiation emitted by the at least one source of electromagnetic radiation.

The processor may be adapted for turning the at least one source of electromagnetic radiation off to prevent inadvertent illumination of objects, e.g. humans, in the space that is otherwise illuminated by the electromagnetic radiation.

The processor may be adapted to determine data based on electromagnetic radiation received from the object placed by the calibrator in the measurement volume.

The processor may be adapted for controlling the scanner to move the measurement volume to scan a desired volume along a desired moving trajectory, e.g. to perform measurements throughout the desired volume larger than the measurement volume; or to perform measurements in sample volumes, e.g. in a regular pattern of volumes separated by volumes wherein no measurements are performed.

The processor may be adapted for
determination of intensities at the at least two wavelengths w1, w2, ..., wn and for
comparison of the determined intensities with a set of reference data for different species, and for
generation of information on biological specificity of the animals based on the comparison.

The processor may be adapted for
determination of intensities at the at least two polarization states p1, p2) and for
comparison of the determined intensities with a set of reference data for different species, and for
generation of information on biological specificity of the animals based on the comparison.

The processor may be adapted for reception of data from the at least one detector of electromagnetic radiation and for analysis of the data in real time; or, may be adapted for data collection on a data storage, such as a hard disk, for subsequent analysis.

For example, about 30000 frames may be collected and saved in one file. This means that the data is effectively an array of 30000×2048, 16 bit values. The frames are collected at about 3 kHz so that every 10 seconds a file is saved.

The processor may be adapted for controlling the source of electromagnetic radiation, e.g. a laser, two lasers, etc., and switch it off when a frame has been recorded and switch it on when a frame without emission of electromagnetic radiation from the source has been recorded and read out from the CCD or CMOS array. In this way, an alternating series of frames may be collected that has the source turned on and off, respectively.

As used herein, the terms "processor", "central processor", "signal processor", "controller", "system", etc., are intended to refer to CPU-related entities, either hardware, a combination of hardware and software, software, or software in execution.

For example, a "processor", "signal processor", "controller", "system", etc., may be, but is not limited to being, a process running on a processor, a processor, an object, an executable file, a thread of execution, and/or a program.

By way of illustration, the terms "processor", "central processor", "signal processor", "controller", "system", etc., designate both an application running on a processor and a hardware processor. One or more "processors", "central processors", "signal processors", "controllers", "systems" and the like, or any combination hereof, may reside within a process and/or thread of execution, and one or more "processors", "central processors", "signal processors", "controllers", "systems", etc., or any combination hereof, may be localized in one hardware processor, possibly in combination with other hardware circuitry, and/or distributed between two or more hardware processors, possibly in combination with other hardware circuitry.

Also, a processor, or similar terms, may be any component or any combination of components that is capable of performing signal processing. For examples, the processor may be an ASIC processor, a FPGA processor, a general purpose processor, a microprocessor, a circuit component, or an integrated circuit.

Reference Data

The reference data may comprise data for at least two different species, such as at least three, at least five, at least 10, at least 100, or at least 1000 species.

Preferably, the set of reference data comprises information of different species for one or more of the following parameters: melanin, wax, chitin, haemoglobin, microstructures of wings, such as periodicity and/or thickness. By one, but preferably more, of these parameters, it is for example possible to determine colouring of an insect, bird, bat or aquatic organism as an indicator of species, gender and/or age. Further, by one, but preferably more, of these parameters, it is for example possible to determine whether a mosquito has taken a meal, e.g., bitten or sucked blood, i.e. whether it may potentially be infected with malaria and pose a risk.

Preferably, the set of reference data comprises spectral differential absorption information of different species for one or more of the following parameters: melanin, wax, chitin, haemoglobin, and microstructures of wings, e.g., periodicity and/or thickness. Preferably, the set of reference data comprises polarization-dependent absorption and/or reflectance information of different species for one or more of the following parameters: melanin, wax, chitin, haemoglobin, and microstructures of wings, e.g., periodicity and/or thickness.

Preferably, the set of reference data comprises differential spectral absorption data of different species. In a preferred embodiment, the set of reference data comprises differential polarization absorption and/or reflectance data of different species.

Preferably, the reference data further comprises information with respect to gender and/or age of a species.

Preferably, the set of reference data is obtained from operating a LIDAR for aerial fauna in an insectarium, also referred to as insectary, with predetermined species of insects. Alternatively, the set of reference data is obtained from operating a LIDAR for aerial fauna in an area with predetermined species of birds and/or bats, and/or or from operating the LIDAR with simultaneously determination of species of birds and/or bats via for example camera and imaging technologies, or via RADAR technologies). Alternatively, the set of reference data are obtained from operating a LIDAR for aquatic fauna in an aquarium with predetermined species of aquatic organisms.

Preferably, a method is provided that generates a set of biological specificity data as the set of reference data by applying the LIDAR system for aerial fauna in an insectarium comprising at least one predetermine species, such as at least two, at least three, at least three, at least five, at least 10, at least 100, or at least 1000 predetermined species.

The set of reference data, or part of the set of reference data, may be embedded within the processor unit of the LIDAR system.

The set of reference data, or part of the set of reference data, may be accessed remotely, for example utilizing cloud computing providing computing power, database storage, applications, etc., via a wide-area-network, such as the Internet.

Lidar Systems

The LIDAR system may comprise a mechanical frame for supporting various parts of the LIDAR system, e.g., a transmitter housing for accommodation of the at least one source of electromagnetic radiation mounted to the frame, and, e.g., at least one receiver housing for accommodation of the at least one detector of electromagnetic radiation mounted to the frame.

The frame may comprise a girder, e.g., of aluminium.

The transmitter housing and the at least one receiver housing may be mounted to the girder.

The LIDAR system may comprise at least one camera arranged for monitoring of the LIDAR system, e.g. the measurement volume of the LIDAR system.

The at least one camera may comprise at least one line scan camera.

The LIDAR system may comprise at least one camera housing for accommodation of the at least one camera and/or line scan camera and mounted to the frame.

The LIDAR system may comprise a scanner that is arranged for moving the frame, e.g. pan and/or tilt and/or pitch and/or traverse the frame, and thereby moving the measurement volume.

The LIDAR system may comprise a calibrator arranged for placing an object with a known optical characteristic in the measurement volume.

The LIDAR system may comprise a trap and a filming unit taking a photograph of an insect collected in the trap. The trap and the filming unit serve to provide additional information to the system, such as for verification, quality, or reference purposes or combinations of these.

The LIDAR system may be portable.

The LIDAR system may comprise
a transmitter unit that emits laser light,
a receiver unit that receives a back-scattered portion of the laser light, and
a processor unit, e.g. data processing or computing unit, programmed to analyse the back-scattered light and generate a set of observations of living organisms, such as animals, such as insects, birds, bats, or aquatic organisms, for example plankton or argulus.

The transmitter unit may be adapted to transmit laser light at at least two wavelengths, w1 and w2, . . . , wn, and the receiver units may be adapted to measure light at w1 and w2, . . . , wn separately, and the processor unit, as part of the analysis, may be adapted to calculate a difference in absorption at w1 and w2 and wn for each observation and generate information about the biological specificity of the living organisms, e.g. animals.

The LIDAR system may comprise
a transmitter unit that emits laser light,
a receiver unit that receives a back-scattered portion of the laser light, and
a processor unit, e.g. data processing or computing unit, programmed to analyse the back-scattered light and generate a set of observations of living organisms, such as animals, such as insects, birds, bats, or aquatic organisms, for example plankton or argulus.

The transmitter unit may be adapted to transmit laser light at at least two polarization states, p1 and p2, and/or the receiver units may be adapted to measure light at two polarization states, p1 and p2, separately, and the processor unit, as part of the analysis, may be adapted to calculate the differential absorption and/or reflectance for each observation and generate information about the biological specificity of the living organisms, e.g. animals.

The LIDAR system may comprise
a transmitter unit that emits laser light,
a receiver unit that receives a back-scattered portion of the laser light, and
a processor unit, e.g. data processing or computing unit, programmed to:
analyse the back-scattered light and generate a set of observations of living organisms, such as animals, such as insects, birds, bats, or aquatic organisms, for example plankton or argulus.

The transmitter unit may be adapted to transmit laser light at at least two wavelengths, w1 and w2, ..., wn, and the receiver units may be adapted to measure light at w1 and w2 and wn separately, and the processor unit, as part of the analysis, may be adapted to calculate a difference in absorption at w1 and w2 and wn for each observation, and to compare this to a set of reference data for different species, and to generate information about the biological specificity of the living organisms, e.g. animals, based on the comparison.

The LIDAR system may comprise
a transmitter unit that emits laser light,
a receiver unit that receives a back-scattered portion of the laser light, and
a processor unit, e.g. data processing or computing unit, programmed to analyse the back-scattered light and generate a set of observations of living organisms, such as animals, such as insects, birds, bats, or aquatic organisms, for example plankton or argulus.

The transmitter unit may be adapted to transmit laser light at at least two polarization states, p1 and p2, and/or the receiver units may be adapted to measure light at two polarization states, p1 and p2, separately, and the processor unit, as part of the analysis, may be adapted to calculate the differential absorption and/or reflectance for each observation, and to compare this to a set of reference data for different species, and to generate information about the biological specificity of the living organisms, e.g. animals, based on the comparison.

The reference data may comprise data for at least two different species, such as at least three, at least five, at least 10, at least 100, or at least 1000 species.

Data Analysis

The processor may be adapted to count the number of animals, such as the number of insects, detected in the measurement volume over a time period.

The processor may further be adapted to extract data for each animal, e.g. for each insect, such as wing-beat oscillations, spherical scattering coefficient (size), spectral information in the optical domain of specific molecules, such as melanin, wax, chitin or haemoglobin, and also of microstructures such as wing membrane thickness.

Scattering process from insects involves diffuse and specular reflectance. Specular reflection could come from the body or the wing depending on the type of species and nature of the body and wing of the insect. If an insect has a furry body and shiny wing or the opposite, the total scatter cross-section will be a combination of diffuse and specular reflections. This can be decomposed into different components to identify the body and wing contributions. In general, specular and diffuse reflectance contributes to the total optical cross-section OCS. The specular reflectance from the wing is responsible for the higher order harmonics. The fundamental tone and lower harmonics represents the diffuse reflectance.

In a LIDAR system with emission of more than one wavelength, chromatic properties of animals in the measurement volume may be determined, e.g. by the processor.

Also iridescence features can be determined, e.g. by the processor, e.g. by comparing the shape of temporal waveforms of received electromagnetic radiation in the visible range VIS with electromagnetic radiation in the near infrared range NIR.

Also melanisation properties can be determined, e.g. by the processor, e.g. by comparing OCS of insects in the NIR and SWIR ranges, since the optical cross-section ratio between NIR and SWIR scales with melanisation.

Determination of insect size is significantly more accurate in the SWIR range as compared to NIR, since NIR OCS depends on the extent of melanisation of the insect, while SWIR OCS is relatively insensitive to insect melanisation.

Melanin is a natural pigment or chromophore that determines the colour of an insect's body and wings. Melanisation gives rise to dark or brownish appearance in the VIS. This is due to multiple reflections of the incident light interaction with the tissue. This effect could introduce some uncertainty in determining absolute optical cross-section OCS of insects in the Ultraviolet (UV), VIS and NIR. SWIR is insensitive to melanisation. Considering the difference between NIR and SWIR, reflectance from insects of different colour and same size could be different depending on which detector used or detection wavelength chosen. Other colouration mechanisms than melanisation exist in the VIS and UV, such as cryptic coloration, warning colour, sexually selected colours, structural colours, etc. These effects have little impact in the NIR, and therefore melanisation is preferably determined, e.g. by the processor, from the ratio of OCS, e.g. back scattered OCS, in the two bands NIR and SWIR rather than from the ratio of OCS in the two bands VIS and SWIR.

Melanisation may be calculated, e.g. by the processor, according to the following equation:

$$\text{Melanisation} = 1 - [(OCS_{NIR})/(OCS_{SWIR} + OCS_{NIR})]$$

wherein
$OCS_{NIR}$ and $OCS_{SWIR}$ are the OCS in the NIR and SWIR ranges, respectively.

The body and wing contribution of the insect to the total OCS may be distinguished, e.g. by the processor, using a sliding temporal minimum filter with width of wing beat periodicity and determine the peak value of the sliding minimum and thereby define the non-oscillatory body contribution to the total OCS.

With high frequency, wing beat modulation as well as higher order harmonics may be resolved, e.g. by calculation of the modulation power spectrum that includes the non-oscillating body contribution of the insect observation in the measurement volume, the fundamental wing-beat frequency and its harmonics overtones. The fundamental frequency may be estimated from the median value of the distance between the peaks in the power spectrum. The relative strength of the odd and even harmonics may be used for the determination, e.g. by the processor, of observed orientation of the insect and ultimately the flight direction. Insects appears large twice during one wing-beat cycle, strong $2\omega$, from the side and appear large once during one wing-beat cycle, strong $1\omega$, according the insect model. This means that the total OCS oscillates depending on the type of insect and the observed orientation of the insect.

Below an example is disclosed of data analysis for insect detection with the LIDAR system.

The at least one detector of electromagnetic radiation may comprise a CCD or CMOS array, e.g. a linear CCD or CMOS array, e.g. a linear CCD or CMOS array with 2048 pixels, wherein each of the pixels of the CCD or CMOS array is arranged for reception of electromagnetic radiation from a specific part of the measurement volume. A CCD or CMOS element of each pixel charges a capacitor in response to the intensity of electromagnetic radiation received by the CCD or CMOS element, i.e. the electromagnetic radiation incident upon it, so that at each point in time the amount of charge of the capacitor corresponds to the integrated intensity of the received electromagnetic radiation. The entire set of charges of capacitors of the CCD or CMOS array is output at regular intervals and denoted a frame. Upon read-out of the capacitor charge values, the capacitors are reset to zero charge.

The processor may be adapted for reception of the frames and for analysis of the frames in real time or may be adapted for data collection on a data storage, such as a hard disk, for subsequent analysis.

For example, about 30000 frames are collected and saved in one file. This means that the data is effectively an array of 30000×2048, 16 bit values. The frames are collected at about 3 kHz so that every 10 seconds a file is saved.

The processor is further adapted for controlling the source of electromagnetic radiation, e.g. a laser, two lasers, etc., and switch it off when a frame has been recorded and switch it on when a frame without emission of electromagnetic radiation from the source has been recorded and read out from the CCD or CMOS array. In this way, an alternating series of frames collected that has the source on and off.

The collected data is processed, e.g. by the processor, as follows:
1. Background subtraction
2. Statistics
3. Thresholding of events
4. Grouping of events
5. Extracting events
6. Quantifying events Each of these steps is shortly detailed below.

Background Subtraction

The alternating series of frames with the laser(s) on and off is used to subtract the background that originates from, e.g., the sunlight. This is done by subtracting a frame without the laser(s) on, also denoted the dark frame, from a frame with the laser(s) on, and also denoted the bright frame. Currently the dark frame directly following the bright frame is subtracted. In the following, the background subtracted data is denoted "the signal".

Optionally, sliding window averaging may be performed on the dark frames before subtracting in order to obtain noise reduction.

Statistics

From the signal some statistics is recovered that is later used to determine when an event, e.g., an object, such as an animal, in the measurement volume, has occurred.

The idea is that events are rare are therefore are not well described by the expected noise.

The processor may perform the following steps:

For each frame of pixels:
1. Determine the median of the signal at each pixel
2. Select all data with a value below the median
3. Determine the standard deviation of the values below the median It is assumed that the signal comprises normal distributed noise and additional rare events. The median is robust against rare events and give a good measure of the peak in the normal distribution. By determining the standard deviation on the lower half of the normal distribution, the rare events do not create a bias and the standard deviation of the noise can be determined.

Thresholding

The rare events are selected by assuming they will be more intense than N times the standard deviation above the median. Presently preferred, N=6 standard deviations above the median are used, but this can be changed. At each of the pixels of the frame, the median and standard deviation are determined and values above the median+N*standard deviation are marked in a binary matrix B.

Grouping of Events

Because the noise can give rise to small and closely spaced islands in the binary matrix that actually belong to the same event, smoothening is performed. This is performed by convoluting signal*B with a 2D Gaussian function with tuneable width (along the distance axis) and height (along the time axis). Subsequently everything in this matrix above a threshold value T is marked as an event. These values are put in the mask matrix M. The width of the Gaussian and the threshold value are not very sensitive values, the Gaussian has a FWHM of a few pixels and the threshold is a constant, e.g. equal to 5.

Numbering of Events

Events are connected areas in the mask matrix M, a standard algorithm is used to number these connected areas (scipy.ndimage.label).

Quantifying Events

The events are now identified and can be further quantified. Several parameters of the at least one parameter may be determined for each event and stored in a data base.

Optical cross section retrieval

One important parameter of the at least one parameter of each event is the optical cross section (OCS) of the animal in the measurement volume generating the signal, which is the equivalent area of a white Lambertian reflector with the same signal strength. The first step in this process is obtaining a calibration standard, for example obtained by:
1. By having a termination point of known reflectivity. The termination point has a known distance and reflects the entire beam therefore it has a known cross section
2. Using another known reflective object in the beam, e.g. a small sphere with known reflectivity and size somewhere at a known distance along the path.
3. Calibrating the setup once in a while by dropping objects of known OCS through the beam, this could be done at any known position or could be done at each pixel.

With the calibration measured the signal can be directly related to the OCS assuming that the signal decreases inversely proportional to the squared distance to the object and the sensitivity is constant at all distances. The latter is not obvious and methods to compensate for this difference in sensitivity are currently investigated. The best methods probably rely on measurements of the air signal, i.e. scattering from dust or humidity in the air.

Other Parameters

Once the OCS is retrieved, other parameters, such as the event length and range, can be determined as well as the total amount of scattered light, peak intensity, its centre of mass in time and in range. Wing-beat frequency and iridescence features of insects may also be determined. Other parameters may be included.

Retrieving Harmonic Content

Further analysis of events exhibiting wing beat characteristics may be performed. The wing and body contribution to the signal may be separated using a sliding minimum filter. Cepstrum analysis may be used to retrieve the fundamental harmonic. Reconstruction of the signal and the harmonics may be performed fitting k harmonics with amplitudes $a_k$ with a harmonic series that is multiplied by the body contribution.

Reconstruction of the time dependent scattering may include use of wavelet transforms.

Polarisation sensitive detection may be included to improve reconstruction of the body signal and thus of the body/wing separation.

In real-time, statistical measures and thresholding may be performed with a sliding window, e.g. a matrix with a first-in first-out structure.

Use

The LIDAR system may be used in agronomics. Agricultural intensification and pesticide use has profound effects on aerial ecology. However, impact on the composition of aerial fauna is not well understood given limitations in monitoring technologies.

Advantageously, the LIDAR system or method is used, e.g. for smart farming, precision agriculture, integrated pest management, environmental impact assessment, smart curtailment, etc., e.g. at a farm or similar to reduce the use of a pesticide and/or agricultural chemical in crops compared to prior year's use of these. By prior years, is meant the yearly average use of a pesticide and/or agricultural chemical over a period of 1 year, alternatively over 3, 5 or 10 years.

A method is provided for optimizing use of pesticides in agriculture. The method comprises the steps of measuring one, two or more species of insects using the LIDAR system, analyse data from the measurement and determined a desired pesticide, spraying time, spraying schedule and/or spraying amount.

A method is provided for optimizing use of agricultural chemicals. The method comprises the steps of measuring one, two or more species of insects using the LIDAR system, analyse data from the measurement and determined a desired agricultural chemical, spraying time, spraying schedule and/or spraying amount. Preferably, the method is automatic and further comprises a database of insect and pesticide and/or agricultural chemical information for determination of spraying parameters, for example pesticide, chemical, amount, time, or schedule.

Advantageously, the LIDAR system is used to exchange measurement data with digital pest and disease modelling platforms.

Advantageously, the LIDAR system may be used in malaria control. Today a major limitation in monitoring malaria mosquitoes is that insect abundance assessment is based on insect traps. Placing and emptying the traps are tedious operations and constitute a major effort, and the results are biased with respect to the species, sexes and age groups caught.

The LIDAR system may be used for malaria mosquito surveillance and enables non-intrusive on site monitoring of malaria mosquitoes improving decision support for national malaria control programs.

Advantageously, the LIDAR system may be used in bird and bat detection at windmill parks. A challenging task in bird monitoring lies in identifying high-altitude migrating bird species and genders.

The LIDAR system may be used by windmill park operators in order to determine critical times of operation and/or times for operational stop.

Advantageously, the LIDAR system may be used for developers of windmill parks prior to determining the optimum sites of operation, whereby information of migrating birds and or endangered bats can be taken into account.

Advantageously, the LIDAR system may be used in aquatic applications, e.g. fish farming. Aquaculture production systems may suffer from undesired aquatic organisms, such as sea lice and carpulus. An increasing problem is chemical treatments to reduce fish diseases, excessive antibiotic use and resistance. This has negative environmental impact, such algae bloom, marine mammal deaths, marine debris, and waste on the ocean floor.

Advantageously, the LIDAR system provides a new tool for analysing aquatic organisms and may be used to reduce the use of chemicals in fish farms and aquaculture production.

Advantageously, the LIDAR system may be used for monitoring of vegetation/seafloor via fluorescence of chlorophyll.

With the LIDAR system and method improved determinations of specificity of insects are performed in-situ.

With the LIDAR system and method quantifying can be performed of aerial or aquatic fauna with respect to biological specificity for at least two species, such as more than three, more than five, more than ten, more than 100, or more than 1000 species.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

In the drawings.

DETAILED DESCRIPTION

Figure 1:
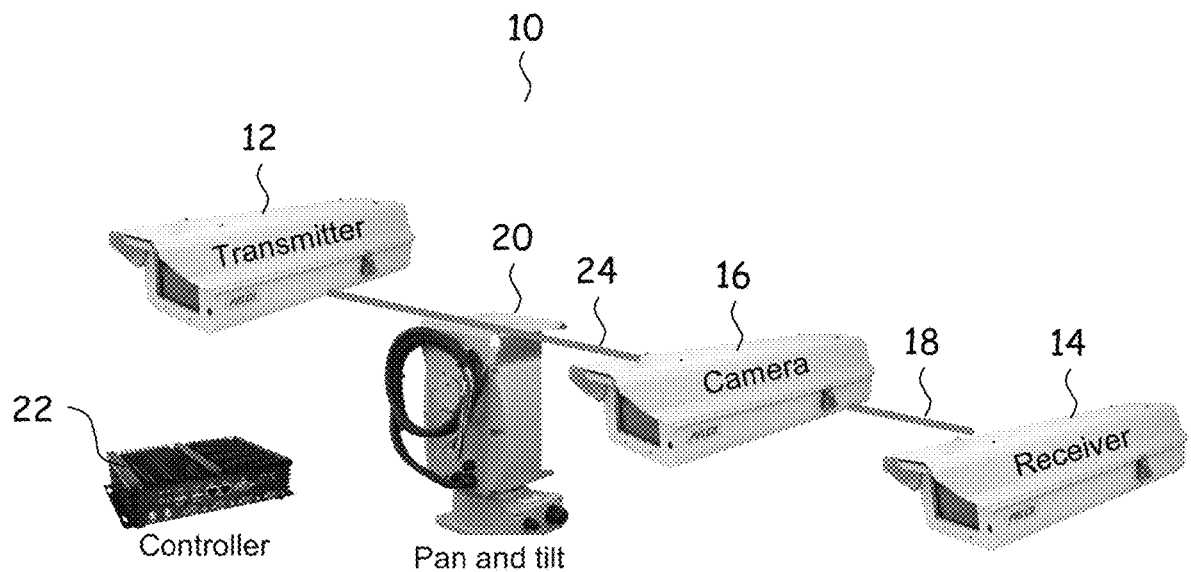
FIG. 1 schematically illustrates various parts of a new LIDAR system.

The LIDAR system and corresponding methods will now be described more fully hereinafter with reference to the accompanying drawings, in which various types of the LIDAR system are shown. The LIDAR system may be embodied in different forms not shown in the accompanying drawings and should not be construed as limited to the embodiments and examples set forth herein. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the LIDAR system and methods according to the appended claims or as a limitation on the scope of the claims. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

FIG. 1 schematically illustrates various parts of a new LIDAR system 10 for analysing fauna in accordance with the appended set of claims.

The illustrated LIDAR system 10 comprises
- a transmitter unit with a transmitter housing 12 that accommodates the at least one source (not visible) of electromagnetic radiation that is adapted for emission of electromagnetic radiation towards a measurement volume for illumination of an animal in the measurement volume,
- a receiver unit with a receiver housing 14 that accommodates the at least one detector (not visible) of electromagnetic radiation that is arranged for provision of at least one output signal in response to reception of electromagnetic radiation having interacted with the animals in the measurement volume,
- a camera unit with a camera housing 16 that accommodates a camera (not visible) that is used for proper alignment of the LIDAR system and optionally for monitoring of the propagation paths of the emitted and received electromagnetic radiation,
- a frame 18 in the form of a girder 24 that supports the transmitter housing 12, the receiver housing 14, and the camera housing 16,
- a scanner 20 that is connected to the frame 18 and arranged for moving the frame 18, e.g. pan and/or tilt and/or pitch and/or traverse the frame 18, and thereby moving the measurement volume, e.g. to scan a desired volume along a desired moving trajectory, e.g. to perform measurements throughout the desired volume larger than the measurement volume; or to perform measurements in sample volumes, e.g. in a regular pattern of volumes separated by volumes wherein no measurements are performed, and
- a processor unit 22 with a processor that is adapted for, based on the at least one output signal from detector(s) in the receiver housing 14,
  detecting animals in the measurement volume,
  counting detected animals, and
  determining at least one parameter of the received electromagnetic radiation relating to the species of the animals.

In FIG. 1, the LIDAR system 10 is shown with a frame 18 with a horizontal girder 24; however, the LIDAR system 10 may also be oriented with a vertical girder 24; or, with the girder 24 having an orientation somewhere between vertical and horizontal.

In one example of the illustrated LIDAR system, the distance between the transmitter housing 12 and the receiver housing 14 is 800 mm, and the housings 12, 14 are arranged so that the proximate end of the measurement volume is located 20 m from the LIDAR system 10 and the distal end of the measurement volume is located 800 m from the LIDAR system 10.

In a first type of the illustrated system 10, the transmitter housing 12 accommodates a laser for emission of a laser beam with wavelengths in the NIR range, e.g. having wavelengths ranging from 750 nm to 1400 nm.

In a second type of the illustrated system 10, the transmitter housing 12 accommodates a laser for emission of a laser beam with wavelengths in the SWIR range, e.g. having wavelengths ranging from 1400 nm to 3000 nm.

In a third type of the illustrated system 10, the transmitter housing 12 accommodates a first laser for emission of a laser beam with wavelengths in the NIR range and a second laser for emission of a laser beam with wavelengths in the SWIR range.

In a large variety of other types of the illustrated system 10, the transmitter housing 12 may accommodate one or more sources of electromagnetic radiation of various types and in various combinations.

The illustrated LIDAR system 10 may have one source of electromagnetic radiation, e.g. emitting electromagnetic radiation at a plurality of wavelengths, e.g. due to emission of harmonics.

Additionally, or alternatively, the illustrated LIDAR system 10 may have more than one source of electromagnetic radiation, and the transmitter housing 12 may accommodate transmitter optics (not visible) arranged so that electromagnetic radiation from different sources coincide, or substantially coincide, in the measurement volume for illumination of a living organism, such as an insect, bird, bat, an aquatic organism, etc., e.g., with the same, or substantially the same, spot size and spot centre for the different respective wavelengths $w1, w2, \ldots, wn$.

By substantially is meant that the receiver(s) (not visible) accommodated in the receiver housing 14 do(es) not experience a difference in signal related to different propagation paths of the electromagnetic radiation $w1, w2, \ldots, wn$.

Preferably, electromagnetic radiation $w1, w2, \ldots, wn$ emitted from the same and/or different sources accommodated in the transmitter housing 12 are separated by at least 100 nm. For example, $w1$ and $w2$ may be near-infrared wavelengths for eye-safety reasons, for example $w1$ may be equal to, or approximately equal to 808 nm, and $w2$ may be equal to, or approximately equal to 980 nm; or, $w1$ may be equal to, or approximately equal to 980 nm, and $w2$ may be equal to, or approximately equal to 1550 nm.

In one type of the illustrated LIDAR system 10, the transmitter housing accommodates two separate continuous wave (CW) lasers.

In one type of the illustrated LIDAR system 10, the transmitter housing accommodates a diode laser.

In one type of the illustrated LIDAR system 10, the transmitter housing accommodates an array of diode lasers.

In one type of the illustrated LIDAR system 10, the transmitter housing accommodates a supercontinuum source.

Optionally, the transmitter housing 12 of the illustrated LIDAR system 10 accommodates transmitter optics (not visible) for emission of beams of electromagnetic radiation of at least two different polarization states p1, p2; wherein the beams are coinciding, or substantially coinciding, in the measurement volume for illumination of a living organism, such as an insect, bird, bat, an aquatic organism, etc., with the same, or substantially the same, spot size and spot centre of the beams with polarization states p1 and p2, respectively.

The optional transmitter optics comprises a half-waveplate to provide different beam paths in at least part of the system 10 for beams of different polarization states p1, p2.

The optional transmitter optics comprises an optical element, wherein the system is designed such that light of p1 or p2 is transmitted through the optical element in the Brewster angle.

Optionally, the transmitter housing 12 accommodates one or more beam shapers (not visible), each of which is adapted for shaping the intensity profile of a respective laser beam into a desired profile, such as a Gaussian intensity profile, at top hat intensity profile, etc. The one or more beam shapers may comprise an optical fibre adapted for shaping the intensity profile of the beam into a Gaussian beam profile. The one or more beam shapers may comprise a phase contrast system adapted for shaping the intensity profile of the beam, such as a Gaussian intensity profile, at top hat intensity profile, etc.

The illustrated LIDAR system 10 comprises a receiver unit with a receiver housing 14 that accommodates the at least one detector (not visible) of electromagnetic radiation that is arranged for provision of at least one output signal in response to reception of electromagnetic radiation having interacted with the animals in the measurement volume. The at least one detector is suitable for detection of the radiation emitted by the at least one source of electromagnetic radiation.

Preferably, the at least one detector comprises a semiconductor detector.

In the first type of the illustrated system 10, the receiver housing 14 accommodates a Si detector, e.g. a quadrant Silicon detector, for detection of electromagnetic radiation with wavelengths in the NIR range.

In the second type of the illustrated system 10, the receiver housing 14 accommodates an InGaAs detector for detection of electromagnetic radiation with wavelengths in the SWIR range.

In the third type of the illustrated system 10, the receiver housing 14 accommodates both a Si detector and an InGaAS detector and a dichroic beam splitter positioned in the propagation path of the electromagnetic radiation in front of the two detectors. The dichroic beam splitter is adapted to transmit SWIR electromagnetic radiation and reflect NIR electromagnetic radiation.

Quadrant detectors enable detection of direction of movement of an animal through the measurement volume based on the timing of the outputs from each quadrant.

In a large variety of other types of the illustrated system 10, the receiver housing 14 may accommodate one or more detectors of various types and in various combinations suitable for detection of electromagnetic radiation emitted by the transmitter unit.

The receiver housing 14 may accommodate a Newtonian telescope (not visible) cooperating with the detector(s) accommodated in the housing for reception of electromagnetic radiation from the measurement volume.

The receiver housing 14 of the receiver unit can be arranged for reception of backscattered electromagnetic radiation from the measurement volume.

The receiver housing 14 of the receiver unit can be arranged for reception of electromagnetic radiation from the measurement volume from an angle different from the direction of propagation of the electromagnetic radiation emitted by the source(s) of electromagnetic radiation residing in the transmitter housing 12.

Optionally, the receiver housing 14 comprises an optical system (not visible) arranged for cooperation with the detector(s) in the receiver housing 14 for directing the received electromagnetic radiation from an area along the laser beam(s) emitted from the transmitter housing 12 onto the receiver(s) of the receiver housing 14. For example, the receiver housing 14 comprises an imaging system (not visible) arranged for cooperation with the detector(s) in the receiver housing 14 in accordance with the Scheimpflug principle by imaging electromagnetic radiation from an area along the emitted laser beam(s) onto the receiver(s) of the receiver housing 14.

Optionally, the receiver housing 14 accommodates a linear CCD or CMOS array with 2048 pixels, wherein each of the pixels of the CCD or CMOS array is arranged for reception of electromagnetic radiation from a specific part of the measurement volume. A CCD or CMOS element of each pixel charges a capacitor in response to the intensity of electromagnetic radiation received by the CCD or CMOS element, i.e. the electromagnetic radiation incident upon it, so that at each point in time the amount of charge of the capacitor corresponds to the integrated intensity of the received electromagnetic radiation. The entire set of 2048 charges of capacitors of the CCD or CMOS array is output at regular intervals and denoted a frame. Upon read-out of the capacitor charge values, the capacitors are reset to zero charge.

The measurement volume is the part of the emitted electromagnetic radiation that the optical system images onto the receiver(s). In this way, the distance from the LIDAR system to an animal detected in the measurement volume can also be determined.

Optionally, the receiver housing 14 accommodates one or more bandpass filter(s) cooperating with the detector(s) also accommodated in the receiver housing 14 for suppression of background signals from the measurement volume and having a centre wavelength within the wavelength range of the source(s) of electromagnetic radiation accommodated in the transmitter housing 12.

Scattering from insects involves diffuse and specular reflectance. Specular reflection could come from the body or the wing depending on the type of species and nature of the body and wing of the insect. If an insect has a furry body and shine wing or the opposite, the total scatter cross-section will be a combination of diffuse and specular reflections. This can be decomposed into different components to identify the body and wing contributions. In general, specular and diffuse reflectance contributes to the total optical cross-section OCS. The specular reflectance from the wing is responsible for the higher order harmonics. The fundamental tone and lower harmonics represents the diffuse reflectance.

In types of the illustrated LIDAR system 10 with emission of more than one wavelength, chromatic properties of animals in the measurement volume may be determined.

Also iridescence features can be determined, e.g. by comparing the shape of temporal waveforms of received electromagnetic radiation in the visible range VIS with electromagnetic radiation in the near infrared range NIR.

Also melanisation properties can be determined, e.g. by comparing OCS of insects in the NIR and SWIR ranges, since the optical cross-section ratio between NIR and SWIR scales with melanisation.

Determination of insect size is significantly more accurate in the SWIR range as compared to NIR, since NIR OCS depends on the extent of melanisation of the insect, while SWIR OCS is relatively insensitive to insect melanisation.

Melanin is a natural pigment or chromophore that determines the colour of an insect's body and wings. Melanisation gives rise to dark or brownish appearance in the VIS. This is due to multiple reflections of the incident light interaction with the tissue. This effect could introduce some uncertainty in determining absolute optical cross-section OCS of insects in the Ultraviolet (UV), VIS and NIR. SWIR is insensitive to melanisation. Considering the difference between NIR and SWIR, reflectance from insects of different colour and same size could be different depending on which detector used or detection wavelength chosen. Other colouration mechanisms than melanisation exist in the VIS and UV, such as cryptic coloration, warning colour, sexually selected colours, structural colours, etc. These effects have little impact in the NIR, and therefore melanisation is preferably determined from the ratio of OCS, e.g. back scattered OCS, in the two bands NIR and SWIR rather than from the ratio of OCS in the two bands VIS and SWIR.

Optionally, the processor of the processor unit 22 is adapted for determination of melanisation according to the following equation:

$$\text{Melanisation} = 1 - [(OCS_{NIR})/(OCS_{SWIR} + OCS_{NIR})]$$

wherein $OCS_{NIR}$ and $OCS_{SWIR}$ are the OCS in the NIR and SWIR ranges, respectively.

Optionally, the processor of the processor unit 22 is adapted for determination of the body and wing contribution of the insect to the total OCS using a sliding temporal minimum filter with width of wing beat periodicity and determining the peak value of the sliding minimum and thereby defines the non-oscillatory body contribution to the total OCS.

With high sampling frequency, optionally, the processor of the processor unit 22 is adapted for determination of wing beat modulation as well as higher order harmonics by calculation of the modulation power spectrum that includes the non-oscillating body contribution of the insect observation in the measurement volume, the fundamental wing-beat frequency and its harmonics. The fundamental frequency is estimated from the median value of the distance between the peaks in the power spectrum. The relative strength of the odd and even harmonics is used for the determination of observed orientation of the insect and ultimately the flight direction. Insects appears large twice during one wing-beat cycle, strong 2ω, from the side and appear large once during one wing-beat cycle, strong 1ω, according the insect model. This means that the total OCS oscillates depending on the type of insect and the observed orientation of the insect.

Below, optional data analysis is disclosed for insect detection with the illustrated LIDAR system 10 with the linear CCD or CMOS array.

The processor of the processor unit 22 is adapted for reception of the frames of the CCD or CMOS array and for analysis of the frames in real time or is adapted for data collection on a data storage, such as a hard disk, for subsequent analysis.

For example, about 30000 frames are collected and saved in one file. This means that the data is effectively an array of 30000×2048, 16 bit values. The frames are collected at about 3 kHz so that every 10 seconds a file is saved.

The processor of the processor unit 22 is further adapted for controlling the source of electromagnetic radiation, e.g. a laser, two lasers, etc., and switch it off when a frame has been recorded and switch it on when a frame without emission of electromagnetic radiation from the source has been recorded and read out from the CCD or CMOS array. In this way, an alternating series of frames collected with the source on and off.

The processor of the processor unit 22 may be adapted for processing the collected data as follows:
1. Background subtraction
2. Statistics
3. Thresholding of events
4. Grouping of events
5. Extracting events
6. Quantifying events Each of these steps is shortly detailed below.

Background Subtraction

The alternating series of frames with the laser(s) on and off is used to subtract the background that originates from, e.g., the sunlight. This is done by subtracting a frame without the laser(s) on, also denoted the dark frame, from a frame with the laser(s) on, and also denoted the bright frame. Currently the dark frame directly following the bright frame is subtracted. In the following, the background subtracted data is denoted "the signal".

Optionally, sliding window averaging may be performed on the dark frames before subtracting in order to obtain noise reduction.

Statistics

From the signal some statistics is recovered that is later used to determine when an event, e.g., an object in the measurement volume, has occurred.

The idea is that events are rare are therefore are not well described by the expected noise.

For each frame of pixels:
1. Determine the median of the signal at each pixel
2. Select all data with a value below the median
3. Determine the standard deviation of the values below the median It is assumed that the signal comprises normal distributed noise and additional rare events. The median is robust against rare events and give a good measure of the peak in the normal distribution. By determining the standard deviation on the lower half of the normal distribution, the rare events do not create a bias and the standard deviation of the noise can be determined.

Thresholding

The rare events are selected by assuming they will be more intense than N times the standard deviation above the median. Presently preferred, N=6 standard deviations above the median are used, but this can be changed. At each of the pixels of the frame, the median and standard deviation are determined and values above the median+N*standard deviation are marked in a binary matrix B.

Grouping of Events

Because the noise can give rise to small and closely spaced islands in the binary matrix that actually belong to the same event, smoothening is performed. This is performed by convoluting signal*B with a 2D Gaussian function with tuneable width (along the distance axis) and height (along the time axis). Subsequently everything in this matrix above a threshold value T is marked as an event. These values are put in the mask matrix M. The width of the Gaussian and the threshold value are not very sensitive values, the Gaussian has a FWHM of a few pixels and the threshold is a constant, e.g. equal to 5.

Numbering of Events

Events are connected areas in the mask matrix M, a standard algorithm is used to number these connected areas (scipy.ndimage.label).

Quantifying Events

The events are now identified and can be further quantified. Several parameters are determined for each event and stored in a data base.

Optical Cross Section Retrieval

One important parameter of each event is the optical cross section (OCS) of the animal in the measurement volume generating the signal, which is the equivalent area of a white Lambertian reflector with the same signal strength. The first step in this process is obtaining a calibration standard, for example obtained by:
1. By having a termination point of known reflectivity. The termination point has a known distance and reflects the entire beam therefore it has a known cross section
2. Using another known reflective object in the beam, e.g. a small sphere with known reflectivity and size somewhere at a known distance along the path.
3. Calibrating the setup once in a while by dropping objects of known OCS through the beam, this could be done at any known position or could be done at each pixel.

With the calibration measured, the signal can be directly related to the OCS. The best calibration methods probably rely on measurements of the air signal, i.e. scattering from dust or humidity in the air.

Other Parameters

Once the OCS is retrieved, other parameters, such as the event length and range, can be determined as well as the total amount of scattered light, peak intensity, its centre of mass in time and in range. Wing-beat frequency and iridescence features of insects may also be determined. Other parameters may be included.

Retrieving Harmonic Content

Further analysis of events exhibiting wing beat characteristics may be performed. The wing and body contribution to the signal may be separated using a sliding minimum filter. Cepstrum analysis may be used to retrieve the fundamental harmonic. Reconstruction of the signal and the harmonics may be performed fitting k harmonics with amplitudes ak with a harmonic series that is multiplied by the body contribution.

Reconstruction of the time dependent scattering may include use of wavelet transforms.

Polarisation sensitive detection may be included to improve reconstruction of the body signal and thus of the body/wing separation.

In real-time, statistical measures and thresholding may be performed with a sliding window, e.g. a matrix with a first-in first-out structure.

One type of the illustrated LIDAR system has a second receiver unit with a fourth housing (not shown) accommodating the same type of components as the receiver housing 12; however, the receiver housing 14 and the fourth housing are arranged for reception of electromagnetic radiation, e.g., with 90 degree mutual separation, so that an animal in the measurement volume may be viewed from the side and the top allowing for good reconstruction of the position of the animal, such as an insect, within the measurement volume and flight direction may be determined.

Optionally, the receiver housing 14 of the receiver unit is mounted on a separate frame that can be positioned in an arbitrary position with relation to the transmitter housing 12 of the transmitter unit for detection of fauna in the measurement volume, e.g. in accordance with the Scheimpflug principle.

Optionally, the fourth housing of the second receiver unit is mounted on a separate frame that can be positioned in an arbitrary position with relation to the transmitter housing 12 of the transmitter unit for detection of fauna in the measurement volume, e.g. in accordance with the Scheimpflug principle.

In the illustrated LIDAR system 10, the processor of the processor unit 22 is adapted for controlling the at least one source of electromagnetic radiation in the transmitter housing 12 and for turning the at least one source of electromagnetic radiation on and off alternatingly, and the processor of the processor unit 22 is further adapted for determination of background emission of electromagnetic radiation from the measurement volume when the at least one source of electromagnetic radiation is turned off.

In the third type of the illustrated system 10, the processor of the processor unit 22 is adapted for determination of intensities at two or more wavelengths w1, w2, . . . , wn and for comparison of the determined intensities with a set of reference data for different species, and for generation of information on biological specificity of the living organisms, e.g. animals.

Optionally, the processor of the processor unit 22 is adapted for determination of intensities at two or more polarization states p1, p2 and for comparison of the determined intensities with a set of reference data for different species, and for generation of information on biological specificity of the living organisms, e.g. animals.

Optionally, the processor of the processor unit 22 is connected to the camera in the camera housing 16 for reception of images from the camera, and the processor of the processor unit 22 is adapted for performing image analysis of images received from the camera and for controlling the source(s) of electromagnetic radiation in the transmitter housing 12 in response to the performed analysis, e.g. during alignment of the system, and e.g. for monitoring obstacles in the propagation paths of the emitted and and/or received electromagnetic radiation and turning the source(s) of electromagnetic radiation in the first hosing 12 off to prevent inadvertent illumination of objects, e.g., humans.

The processor of the processor unit 22 is adapted for controlling the scanner 20 to move the measurement volume across a desired volume along a desired moving trajectory e.g. to perform measurements throughout the desired volume larger than the measurement volume; or, to perform measurements in sample volumes, e.g. in a regular pattern of volumes separated by volumes wherein no measurements are performed.

In addition to counting the number of detected insects, the processor of the processor unit 22 may further extract data for each insect, such as wing-beat oscillations, spherical scattering coefficient (size), spectral information of specific molecules, such as melanin, wax, chitin or haemoglobin, and also of microstructures, such as wing membrane thickness.

The processor of the processor unit 22 may be adapted to determine reference data based on electromagnetic radiation received from the animal in the measurement volume.

The reference data may comprise data for at least two different species, such as at least three, at least five, at least 10, at least 100, or at least 1000 species.

Preferably, the set of reference data comprises information of different species for one or more of the following parameters: melanin, wax, chitin, haemoglobin, and microstructures of wings, e.g., periodicity and/or thickness. By one, but preferably more, of these parameters, it is for example possible to determine colouring of an insect, bird, bat or aquatic organism as an indicator of species, gender and/or age. Further, by one, but preferably more, of these parameters, it is for example possible to determine whether a mosquito has taken a meal, e.g. bitten or sucked blood, i.e. whether it may potentially be infected with malaria and pose a risk.

Preferably, the set of reference data comprises spectral differential absorption information of different species for one or more of the following parameters: melanin, wax, chitin, haemoglobin, and microstructures of wings, e.g., periodicity and/or thickness).

Preferably, the set of reference data comprises polarization-dependent absorption and/or reflectance information of different species for one or more of the following parameters:

melanin, wax, chitin, haemoglobin, and microstructures of wings, e.g., periodicity and/or thickness.

Preferably, the set of reference data comprises differential spectral absorption data of different species. In a preferred embodiment, the set of reference data comprises differential polarization absorption and/or reflectance data of different species.

Preferably, the reference data further comprises information with respect to gender and/or age of a species.

Preferably, the set of reference data is obtained from operating the illustrated LIDAR system 10 in an insectarium (also referred to as insecatary) with predetermined species of insects.

Alternatively, or additionally, the set of reference data is obtained from operating the illustrated LIDAR system 10 in an area with predetermined species of birds and/or bats, and/or or from operating the illustrated LIDAR system 10 with simultaneously determination of species of birds and/or bats via for example camera and imaging technologies, or utilizing RADAR technologies.

Alternatively, or additionally, the set of reference data is obtained from operating the illustrated LIDAR system 10 for aquatic fauna in an aquarium with predetermined species of aquatic organisms.

Preferably, a method is provided that generates a set of biological specificity data by applying the illustrated LIDAR system 10 in an insectarium comprising at least one predetermine species, such as at least two, at least three, at least three, at least five, at least 10, at least 100, or at least 1000 predetermined species.

The set of reference data, or part of the set of reference data, may be embedded within the processor of the processor unit 22 of the illustrated LIDAR system 10.

The set of reference data, or part of the set of reference data, may be accessed remotely, for example via a cloud-based solution.

Optionally, the illustrated LIDAR system 10 comprises a calibrator (not shown) arranged for placing an object with a known optical characteristic in the measurement volume.

Optionally, the illustrated LIDAR system 10 comprises a trap and a filming unit taking a photograph of an insect collected in the trap. The trap and the filming unit serve to provide additional information to the system, such as for verification, quality, or reference purposes or combinations of these.

The illustrated LIDAR system 10 may be used in agronomics. Agricultural intensification and pesticide use has profound effects on aerial ecology. However, impact on the composition of aerial fauna is not well understood given limitations in monitoring technologies.

A method is provided for optimizing use of pesticides in agriculture. The method comprises the steps of measuring one, two or more species of insects using the illustrated LIDAR system 10, analyse data from the measurement, e.g. using supervised or unsupervised learning algorithms etc., and determine a desired pesticide, spraying time, spraying schedule and/or spraying amount.

A method is provided for optimizing use of agricultural chemicals. The method comprises the steps of measuring one, two or more species of insects using the Illustrated LIDAR system 10, analyse data from the measurement and determine a desired agricultural chemical, spraying time, spraying schedule and/or spraying amount. Preferably, the method is automatic and further and further comprises data exchange with a digital pest and disease modelling platform for determination of spraying parameters, for example pesticide, chemical, amount, time, or schedule.

Preferably, the Illustrated LIDAR system 10 or method is used at a farm or similar to reduce the use of a pesticide and/or agricultural chemical in crops compared to prior year's use of these. By prior years, is meant the yearly average use of a pesticide and/or agricultural chemical over a period of 1 year, alternatively over 3, 5 or 10 years.

Advantageously, the Illustrated LIDAR system 10 may be used in vector control, such as malaria control. Today a major limitation in monitoring malaria mosquitoes is that insect abundance assessment is based on insect traps. Placing and emptying the traps are tedious operations and constitute a major effort, and the results are biased with respect to the species, sexes and age groups caught.

The Illustrated LIDAR system 10 may be used for vector surveillance, such as malaria mosquito surveillance, and enables non-intrusive on site monitoring, e.g. of malaria mosquitoes, improving decision support for national vector control programs.

Advantageously, the Illustrated LIDAR system 10 may be used for monitoring threatened and endangered species of birds and bats. A challenging task in bird monitoring lies in identifying high-altitude bird species and genders.

Advantageously, the Illustrated LIDAR system 10 may be used for bird and bat detection at windmill parks.

The Illustrated LIDAR system 10 may be used by windmill park operators in order to determine critical times of operation and/or times for operational stop.

Advantageously, the Illustrated LIDAR system 10 may be used for developers of windmill parks prior to determining the optimum sites of operation, whereby information of migrating birds and or endangered bats can be taken into account.

Advantageously, the Illustrated LIDAR system 10 may be used in aquatic applications. Aquaculture production systems may suffer from undesired aquatic organisms, such as sea lice and carpulus. An increasing problem is chemical treatments to reduce fish diseases, excessive antibiotic use and resistance. This has negative environmental impact, such algae bloom, marine mammal deaths, marine debris, and waste on the ocean floor.

Advantageously, the Illustrated LIDAR system 10 provides a new tool for analysing aquatic organisms and may be used to reduce the use of chemicals in fish farms and aquaculture production.

Advantageously, the Illustrated LIDAR system 10 may be used for monitoring of vegetation/seafloor via fluorescence of chlorophyll.

With the Illustrated LIDAR system 10 and method improved determinations of specificity of insects are performed in-situ.

With the Illustrated LIDAR system 10 and method quantifying can be performed of aerial or aquatic fauna with respect to biological specificity for at least two species, such as more than three, more than five, more than ten, more than 100, or more than 1000 species.

Figure 2:
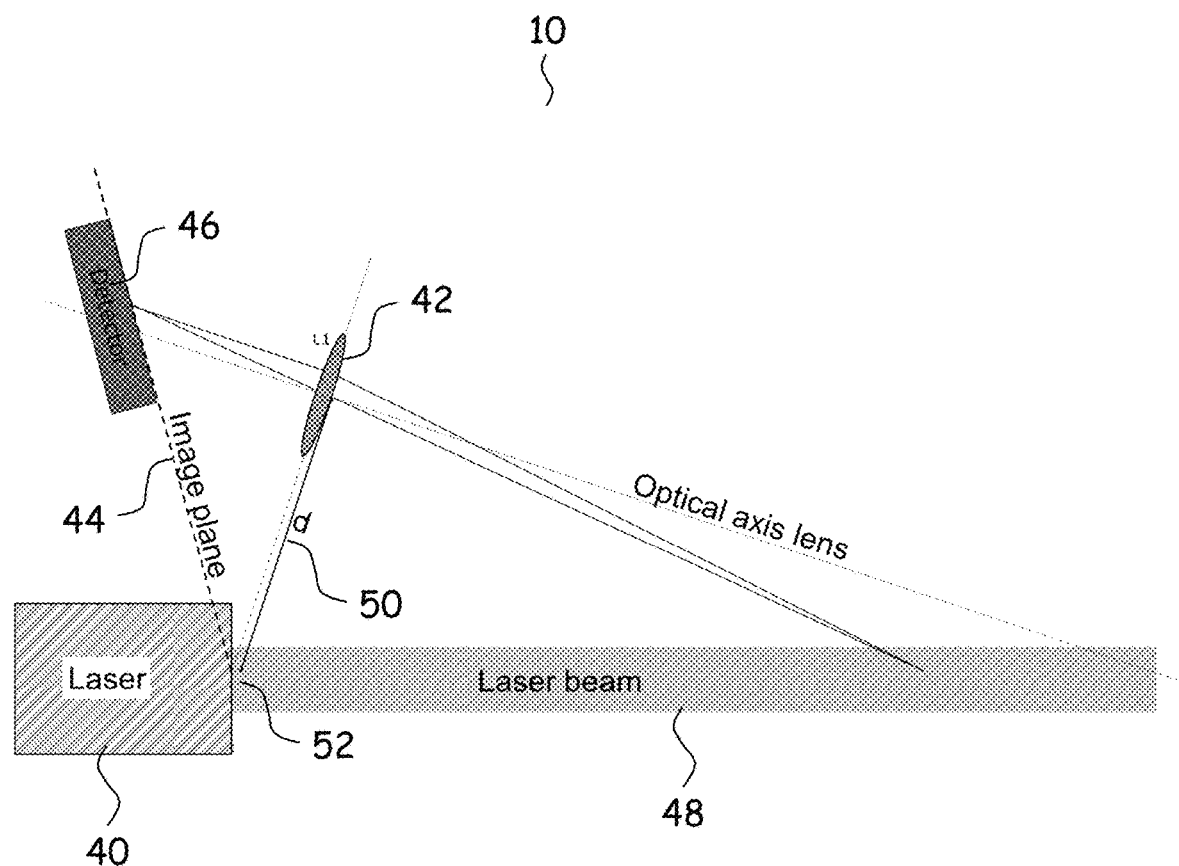
FIG. 2 schematically illustrates a new LIDAR system with a single laser and operating in accordance with the Scheimpflug principle, FIG. 3 schematically illustrates the LIDAR system of FIG. 2 with an added camera, FIG. 4 schematically illustrates a new LIDAR system with a Newtonian telescope, FIG. 5 schematically illustrates a new LIDAR system with a single laser and two detectors, FIG. 6 schematically illustrates a new LIDAR system with a Newtonian telescope and a camera, FIG. 7 schematically illustrates a new LIDAR system with two lasers and two detectors operating according to the Scheimpflug principle.

FIG. 2 schematically illustrates one optical configuration of the LIDAR system 10 shown in FIG. 1 and of a type with a transmitter unit with a transmitter housing accommodating a single laser 40 and with a receiver unit with a receiver housing that is arranged for operation in accordance with the Scheimpflug principle.

In optical imaging systems, an object plane is usually imaged onto an image plane that is parallel to the object plane, and the imaging is performed with a lens that provides a focussed image of the object plane onto the image plane. The lens has an optical axis perpendicular to the object plane and the image. If, however, the optical axis of the lens is tilted with respect to the image plane, the plane imaged onto the image plane with sharp focus will also be tilted according to geometrical and optical properties. In FIG. 2, a lens 42 of the receiver unit is tilted according to the Scheimpflug principle so that the object plane that is focussed onto the image plane 44 of the detector 46 contains the laser beam 48 emitted by the laser 40 of the transmitter unit. In this way, a large part of the laser beam 48 is focussed onto the image plane 44 of the detector 46, and both near and far parts of the laser beam 48 will be in focus. The image plane 44 of the detector 46 and a lens plane 50 of the lens 42 intersect with the laser beam 48 at what is called the Scheimpflug intersection point 52.

The detector 46 is a linear CCD or CMOS array with 2048 pixels arranged so that each of the pixels of the CCD or CMOS array receives electromagnetic radiation from a specific part of the laser beam 48 along the length of the laser beam 48 so that ranging can be performed due to the one-to-one imaging of individual segments of the laser beam 48 along the length of the laser beam 48 onto respective individual CCD or CMOS pixels.

Otherwise, the LIDAR system 10 of FIG. 2 operates as explained in connection with FIG. 1.

Figure 3:
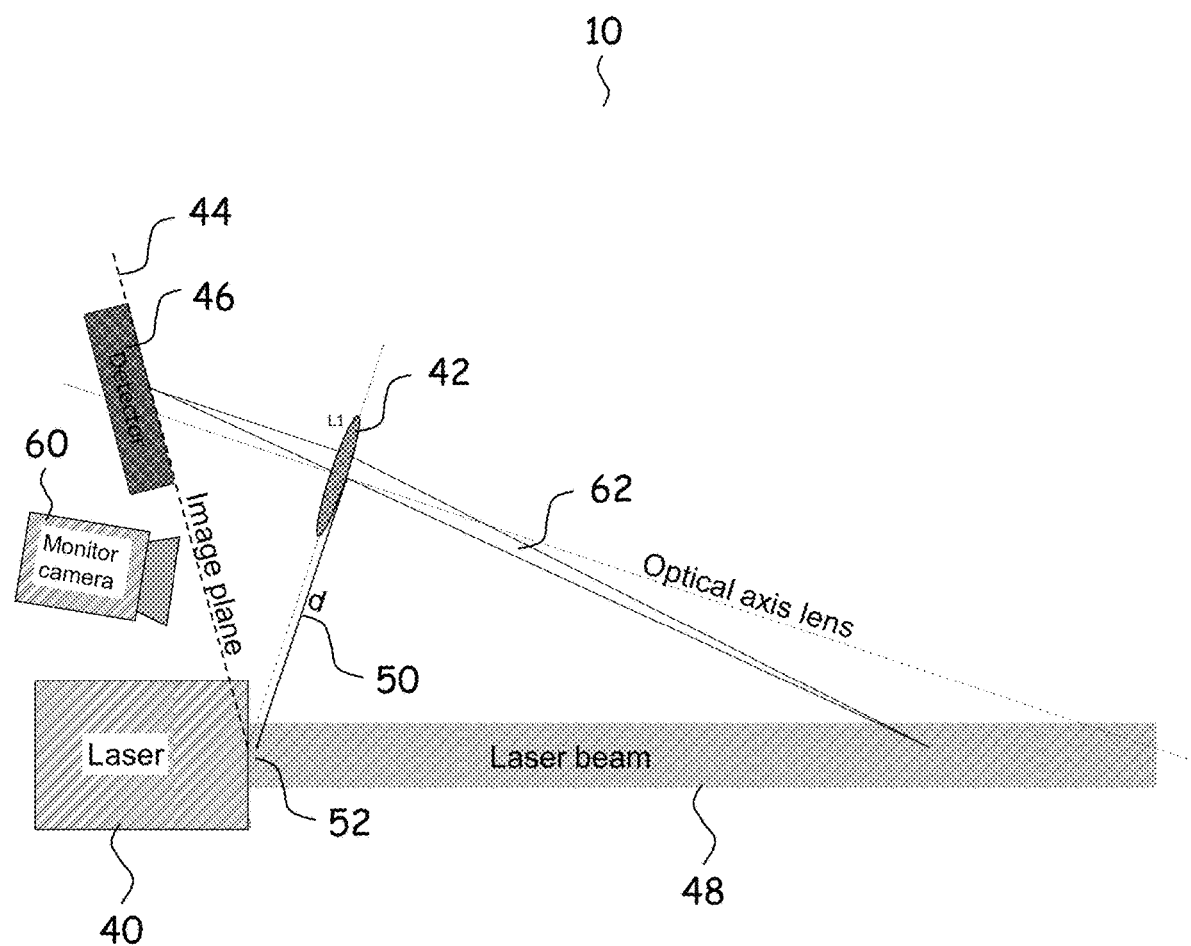

FIG. 3 schematically illustrates the LIDAR system 10 similar to the LIDAR system 10 shown in FIG. 2 except for the fact that a camera 60 has been added to the LIDAR system 10.

The camera 60 is used for proper alignment of the LIDAR system 10 and optionally for monitoring of the propagation paths of the emitted and received electromagnetic radiation 48, 62. Optionally, the processor of the processor unit 22 (see FIG. 1) is connected to the camera 60 for reception of images from the camera 60, and the processor of the processor unit 22 is adapted for performing image analysis of images received from the camera and for controlling the source 40 of electromagnetic radiation in response to the performed analysis, e.g. during alignment of the system, and e.g. for monitoring obstacles in the propagation paths of the emitted and/or received electromagnetic radiation 48, 62 and turning the source 40 of electromagnetic radiation off to prevent inadvertent illumination of objects, e.g. humans.

Figure 4:
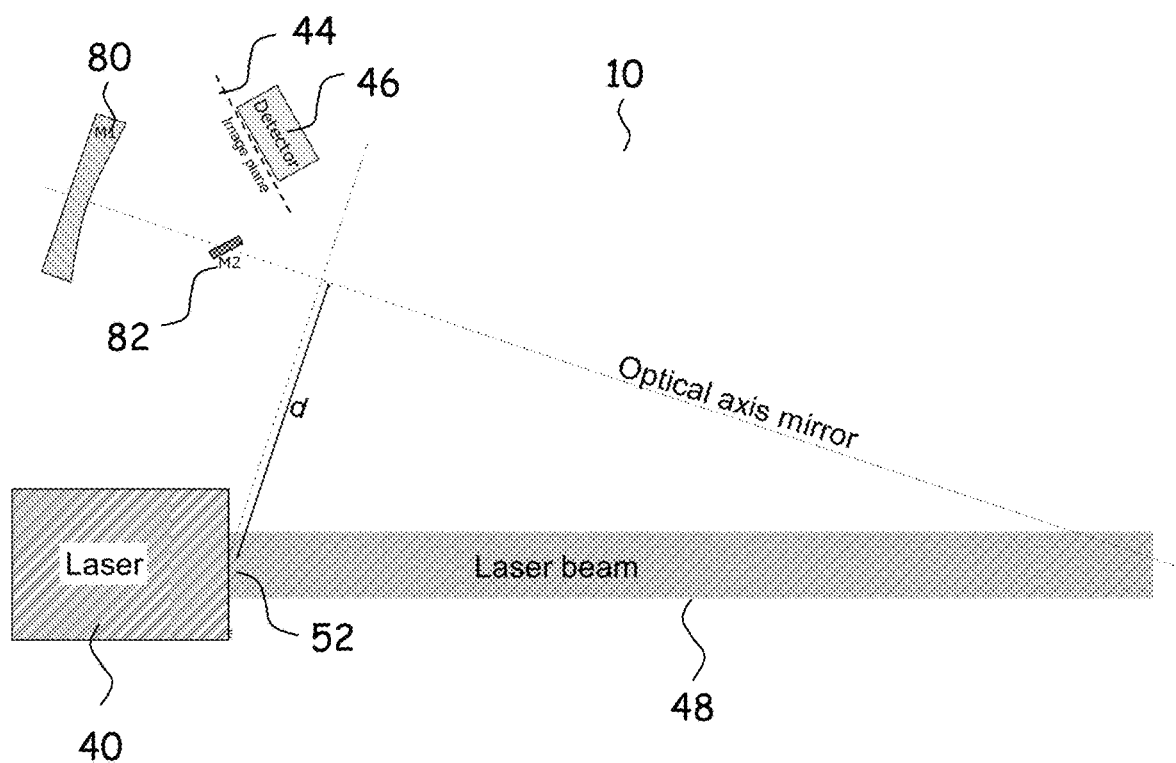

FIG. 4 schematically illustrates a LIDAR system 10 similar to the LIDAR system 10 shown in FIG. 2 except for the fact that a Newtonian telescope (only mirrors shown) with focussing mirror 80 and mirror 82 has been added to the LIDAR system 10. Otherwise, the LIDAR system 10 of FIG. 4 operates in the same way as the LIDAR system 10 of FIG. 2.

Figure 5:
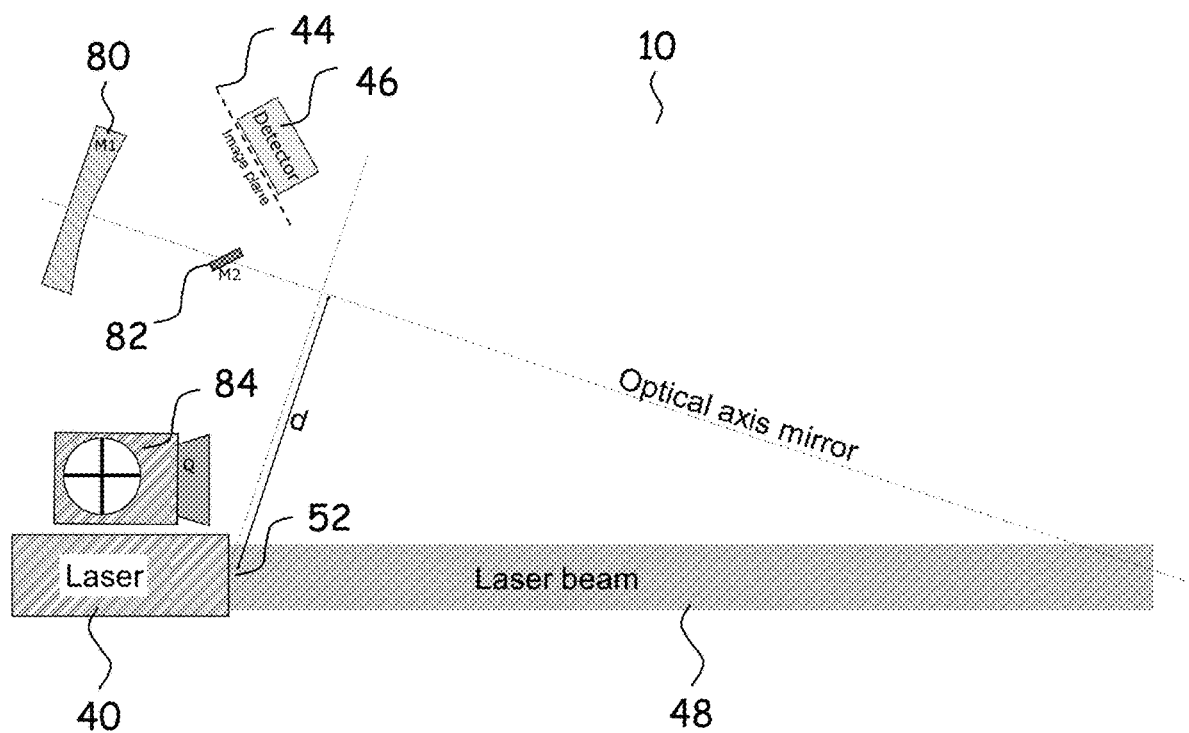

FIG. 5 schematically illustrates a LIDAR system 10 similar to the LIDAR system 10 shown in FIG. 4 except for the fact that another receiver housing 84 has been added to the system 10 proximate the transmitter housing with the laser 40, wherein the other receiver housing 84 accommodates a Si quadrant detector for detection of backscattered NIR radiation for detection of direction of movement through the measurement volume as explained above.

Otherwise, the LIDAR system 10 of FIG. 5 operates as explained in connection with FIG. 4.

Figure 6:
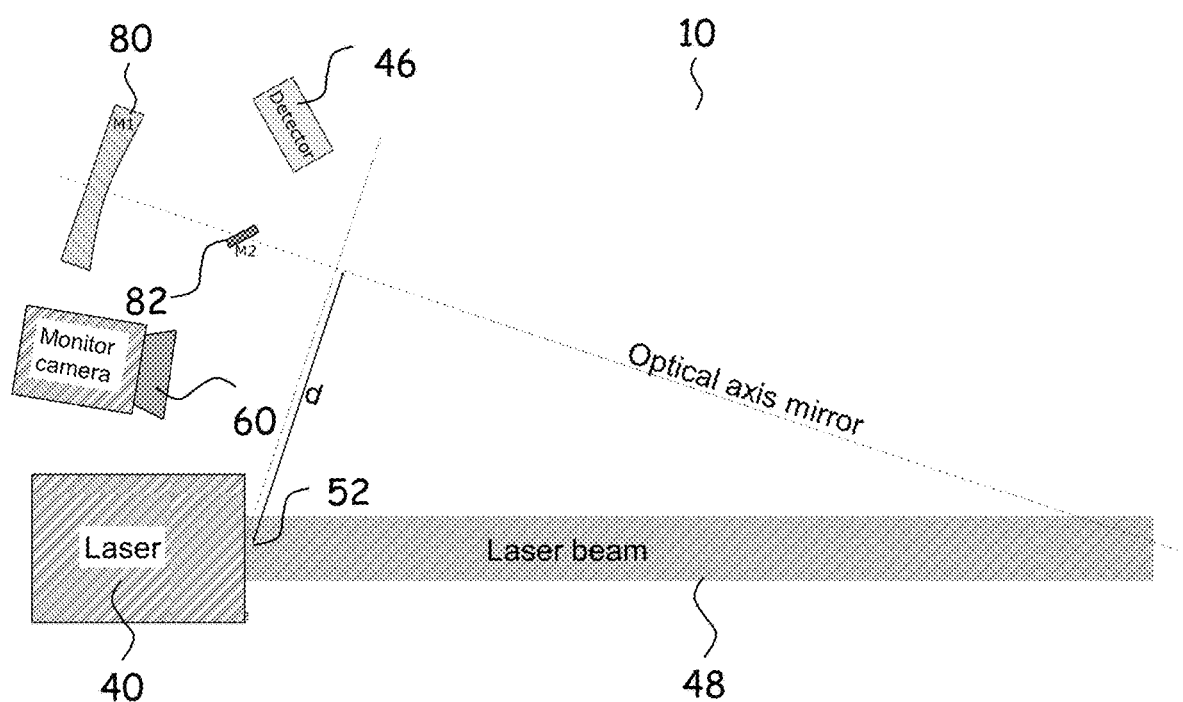

FIG. 6 schematically illustrates a LIDAR system 10 similar to the LIDAR system 10 shown in FIG. 4 except for the fact that a camera 60 has been added to the LIDAR system 10. The camera 60 is connected to the processor of the processor unit 22 for operation in the same way as explained in connection with FIG. 3.

Figure 7:
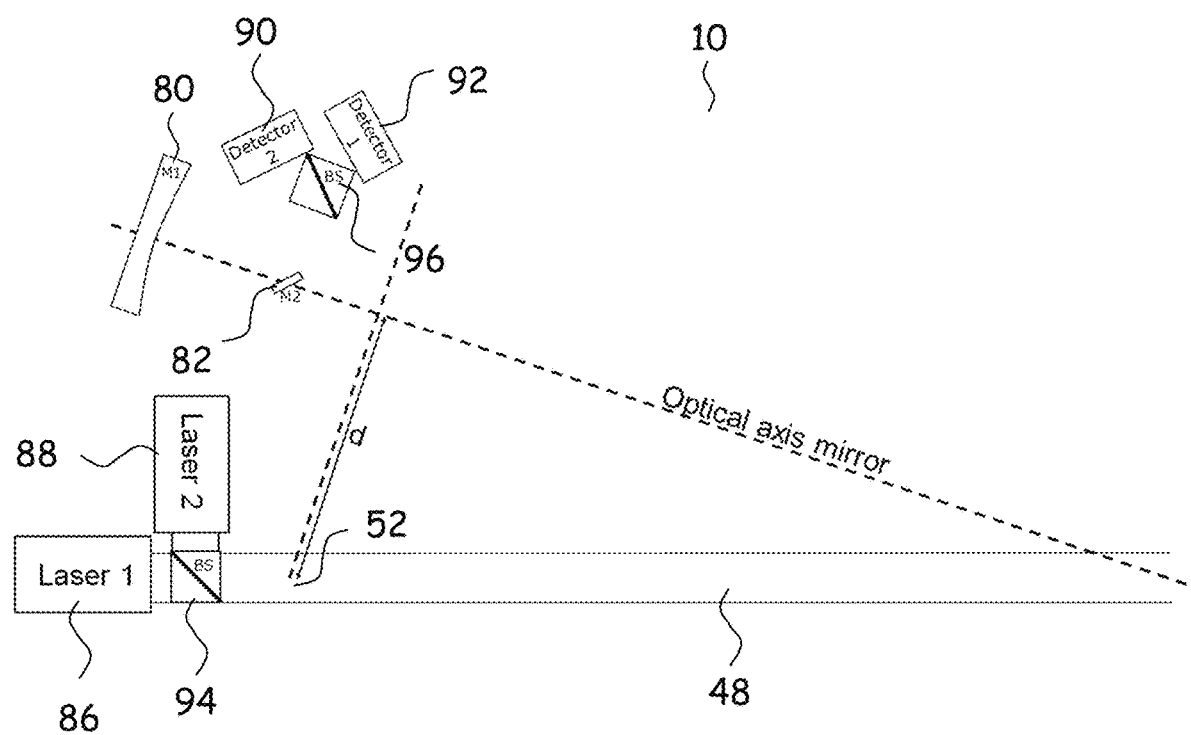

FIG. 7 schematically illustrates a LIDAR system 10 similar to the LIDAR system 10 shown in FIG. 4 except for the fact that the transmitter unit includes two lasers 86, 88 for emission of electromagnetic radiation of different wavelengths w1, w2, and the receiver unit includes two semiconductor detectors 90, 92, namely linear CCD or CMOS arrays 90, 92 with 2048 pixels, suitable for detection of electromagnetic radiation of the respective wavelengths w1, w2. The lasers 86, 88 and the semiconductor detectors 90, 92 cooperate with respective beamsplitters 94, 96 for proper operation in a way well-known to the person skilled in the art. The length of the measurement volume is of the order of 100 m. Moreover, the illustrated LIDAR system 10 operates as explained in connection with FIG. 4.

Figure 8:
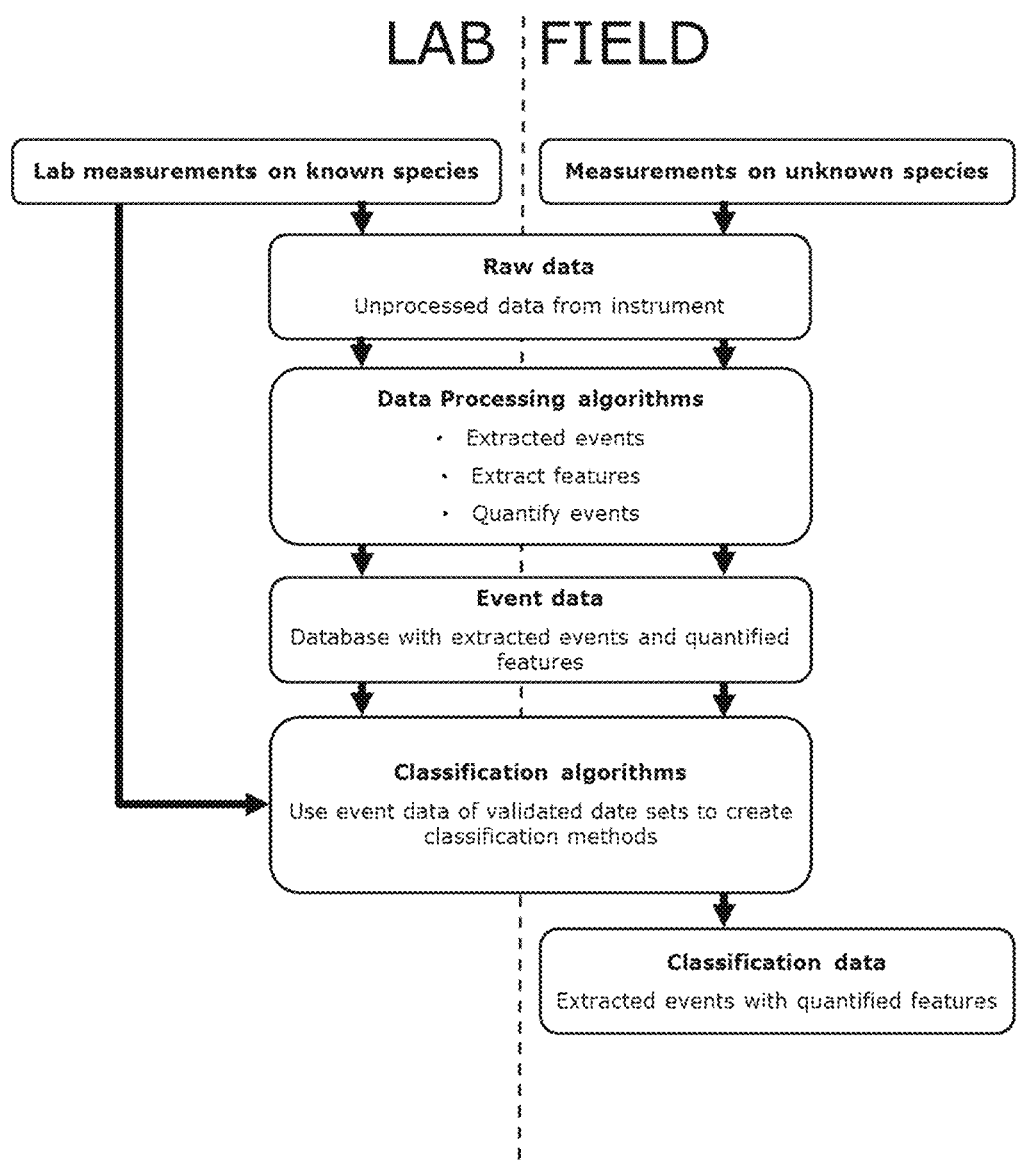
FIG. 8 is a flowchart of determining and classifying fauna with the new LIDAR system.

FIG. 8 shows a flowchart of determining and classifying fauna with the new LIDAR system 10. The process is described in more detail in connection with FIG. 1.

Figure 9:
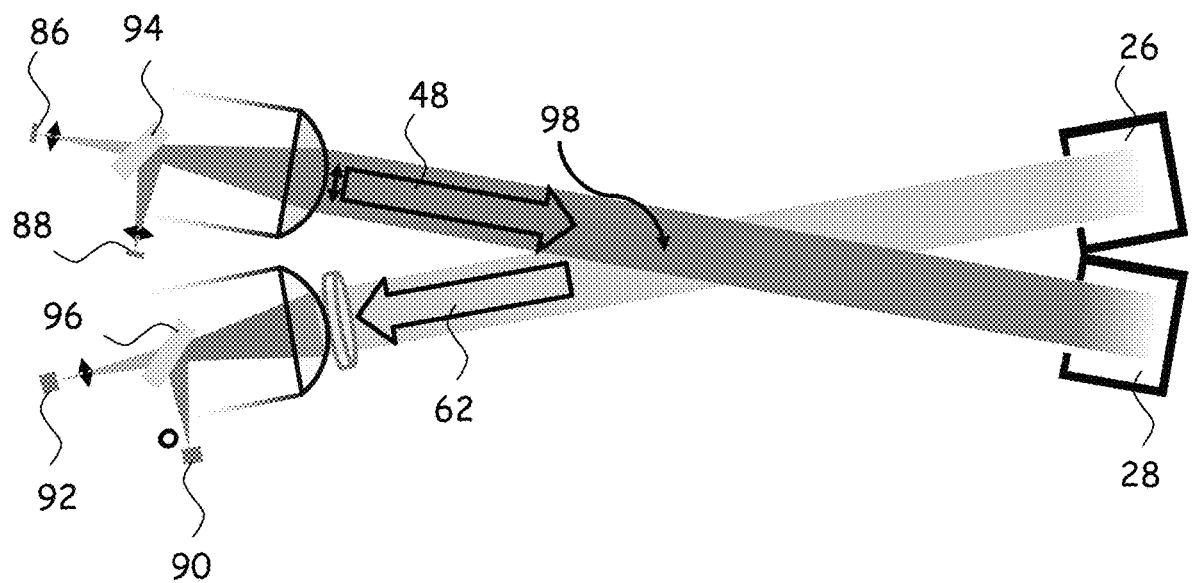
FIG. 9 shows a schematic illustration of a LIDAR system for reference measurement of an insect.

FIG. 9 shows schematically a LIDAR system 10 for reference measurements of insects. The measurement volume of the illustrated LIDAR system 10 has a relatively short length of approximately 3 m. The semiconductor detectors 90, 92 and the receiving optics are arranged for detection of backscattered electromagnetic radiation and the semiconductor detectors 90, 92 are single element or pixel detectors.

Figure 10:
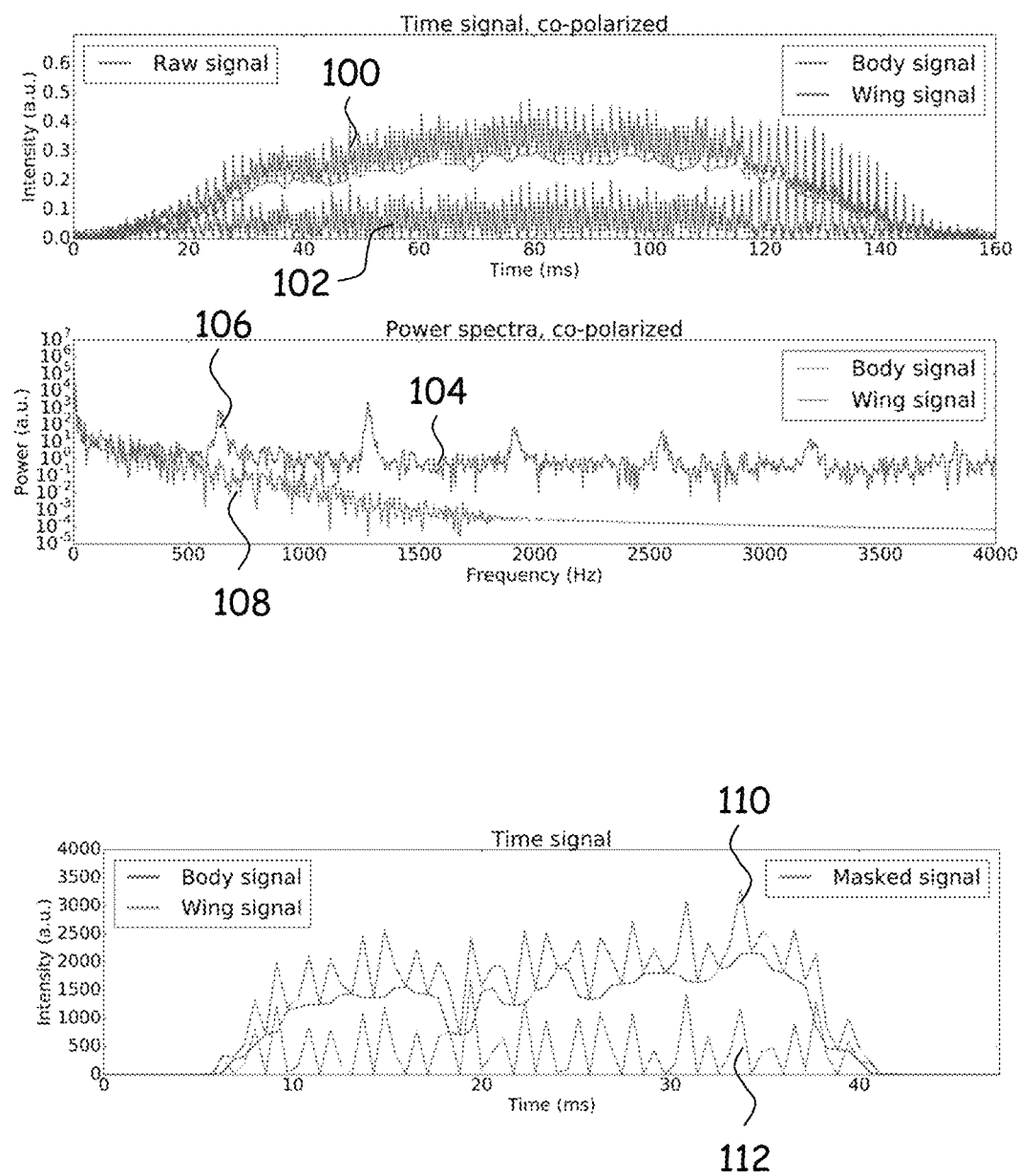
FIG. 10 shows plots of detector signals.

FIG. 10 shows plots of detector signals and processed detector signal. The curve 100 is a plot of an output signal of a detector of a laboratory LIDAR system with an insect in the measurement volume. The output signal is recorded with a high sample frequency and intensity variations caused by the wing beat of the insect is shown with a high resolution. The low frequency pedestal of the signal is caused by the signal contribution from the body of the insect. In the lower curve 102 of the plot, the pedestal has been subtracted from the output signal for provision of the signal contribution from the wings of the insect. The curve 104 shows a Fourier transformation of the signal contribution from the wings showing a fundamental frequency 106 of the wing beat of approximately 700 Hz and a number of harmonic frequencies of the wing beat frequency. The curve 108 shows a Fourier transformation of the signal contribution from the body of the insect.

The curve 110 is a plot of an output signal of a detector of a field LIDAR system with an insect in the measurement volume. The output signal is recorded with a low sample frequency and intensity variations caused by the wing beat of the insect is shown with a low resolution. The low frequency pedestal of the signal is caused by the signal contribution from the body of the insect. In the lower curve 112 of the plot, the pedestal has been subtracted from the output signal for provision of the signal contribution from the wings of the insect.

Figure 11:
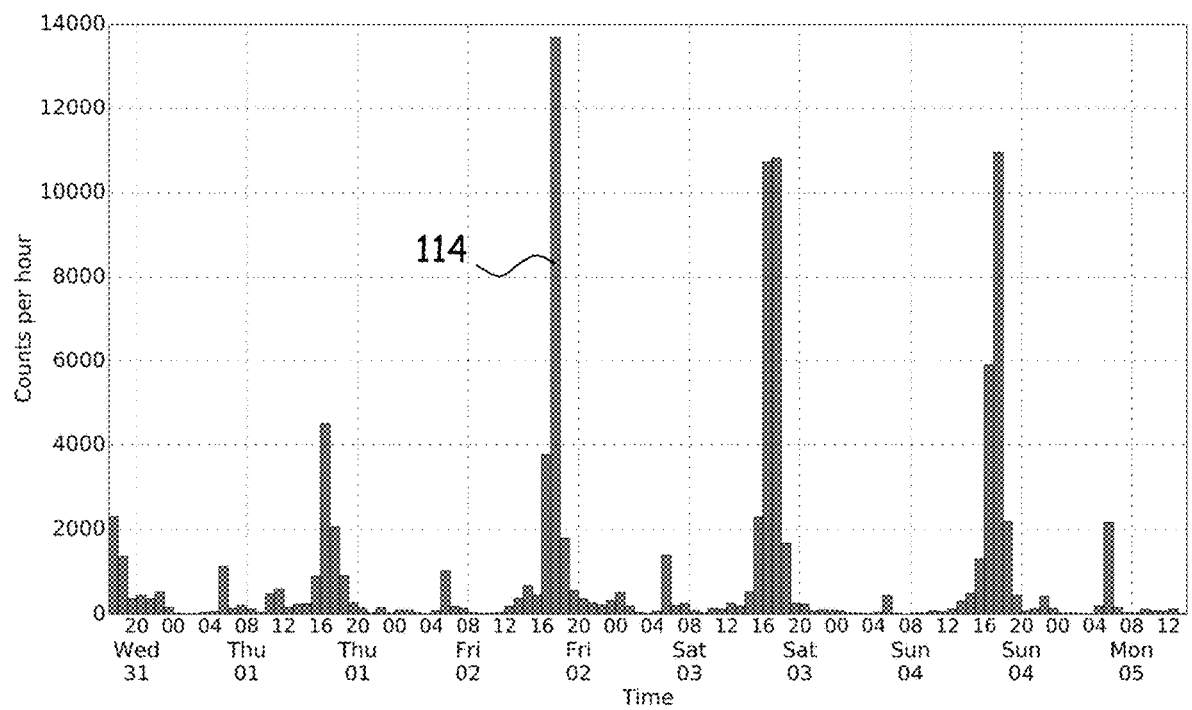
FIG. 11 shows a histogram of numbers of detected insects.

FIG. 11 shows a histogram of numbers of detected insects 114 in the field in counts per hour as a function of time. A circadian rhythm of the detected insects is clearly visible.

Figure 12:
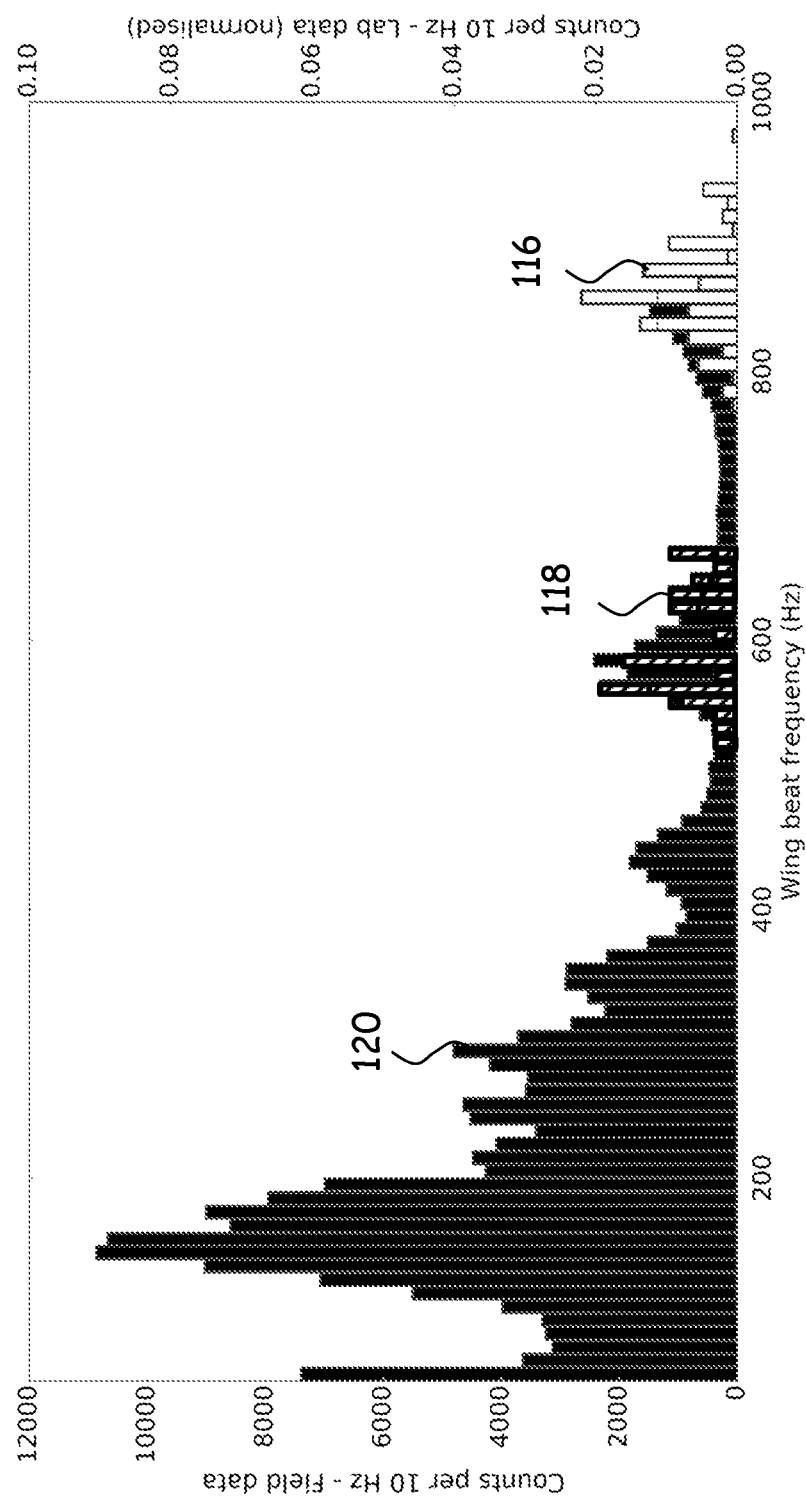
FIG. 12 shows histograms illustrating recognition of certain mosquitoes.

FIG. 12 shows histograms illustrating recognition of certain mosquitoes. Reference data on wing beat frequencies of various types of male and female mosquitoes has been obtained under laboratory conditions by releasing a number of individuals of the same sex and type and determining their wing beat frequencies with the laboratory LIDAR system. This is repeated for a number of types of mosquitoes. The plot shows resulting histograms of wing beat frequencies of male Aedis aegypti 116 and of female Aedis aegypti 118. The plot also shows a histogram 120 of all wing beat frequencies recorded in the field for comparison with the reference data 116, 118. It seems that male and female Aedis aegypti were detected during the field measurements.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

With the description above, a person skilled in the art of photonics would be able to carry out the various LIDAR systems and methods according to the appended claims. Examples of practical implementation of a LIDAR system and data processing can be found in literature, including Mikkel Brydegaard, Aboma Merdasa, Alem Gebru, Hiran Jayaweera, and Sune Svanberg, "Realistic Instrumentation Platform for Active and Passive Optical Remote Sensing," Appl. Spectrosc. 70, 372-385 (2016), included herein by reference, and Brydegaard, M. (2015): "Towards Quantitative Optical Cross Sections in Entomological Laser Radar—Potential of Temporal and Spherical Parameterizations for Identifying Atmospheric Fauna." PLOS ONE, DOI: 10.1371/journal.pone.0135231 also included herein by reference, and Mikkel Brydegaard, Alem Gebru, and Sune Svanberg, "Super Resolution Laser Radar with Blinking Atmospheric Particles—Application to Interacting Flying Insects", Progress In Electromagnetics Research, Vol. 147, 141-151, 2014 also included herein by reference.

The invention claimed is:

1. A LIDAR system for analysing insects, comprising
   at least one source of electromagnetic radiation that is adapted for emission of electromagnetic radiation towards a measurement volume for illumination of insects in the measurement volume,
   at least one detector of electromagnetic radiation that is arranged for provision of at least one output signal in response to reception of electromagnetic radiation having interacted with the insects in the measurement volume, and
   a processor having access to a set of reference data obtained from operating a LIDAR system for aerial fauna in an insectarium with predetermined species of insects, the reference data comprising data for at least two different species; wherein the processor is adapted for, based on the at least one output signal,
   detecting insects in the measurement volume,
   counting detected insects, and
   determining at least one parameter of the received electromagnetic radiation relating to the species of the insects
   comparing the determined at least one parameter with the set of reference data for different species, and
   generating information on biological specificity of the insects based on the comparison,
   wherein at least one first detector of the at least one detector of electromagnetic radiation is arranged for reception of electromagnetic radiation from the measurement volume from a first angle different from the direction of propagation of the electromagnetic radiation emitted by the at least one source of electromagnetic radiation,
   the LIDAR system further comprising a first optical system arranged for cooperation with the at least one first detector in accordance with the Scheimpflug principle for reception of electromagnetic radiation from the measurement volume from the first angle.

2. A LIDAR system according to claim 1, wherein the comparison includes comparison of a distribution of values of the at least one parameter with a corresponding distribution of values of the set of reference data.

3. A LIDAR system according to claim 1, wherein at least one second detector of the at least one detector of electromagnetic radiation is arranged for reception of electromagnetic radiation backscattered from the measurement volume.

4. A LIDAR system according to claim 1, wherein at least one third detector of the at least one detector of electromagnetic radiation is arranged for reception of electromagnetic radiation from the measurement volume from a second angle different from the direction of propagation of the electromagnetic radiation emitted by the at least one source of electromagnetic radiation and different from the first angle.

5. A LIDAR system according to claim 3, comprising a first optical system arranged for cooperation with the at least one second detector for reception of electromagnetic radiation backscattered from the measurement volume.

6. A LIDAR system according to claim 4, comprising a third optical system arranged for cooperation with the at least one third detector in accordance with the Scheimpflug principle for reception of electromagnetic radiation from the measurement volume from the second angle different from the first angle.

7. A LIDAR system according to claim 1, wherein the processor is adapted for controlling the at least one source of electromagnetic radiation and for turning the at least one source of electromagnetic radiation on and off alternatingly, and wherein the processor is further adapted for determination of background emission of electromagnetic radiation from the measurement volume when the at least one source of electromagnetic radiation is turned off.

8. A LIDAR system according to claim 1, comprising at least one imaging system for imaging the measurement volume onto the at least one detector.

9. A LIDAR system according to claim 1, comprising
a frame,
a transmitter housing for accommodation of the at least one source of electromagnetic radiation mounted to the frame, and
at least one receiver housing for accommodation of the at least one detector of electromagnetic radiation mounted to the frame.

10. A LIDAR system according to claim 1, comprising at least one camera arranged for monitoring of the measurement volume.

11. A LIDAR system according to claim 10, wherein the processor is connected to the at least one camera for reception of images from the at least one camera and wherein the processor is adapted for performing image analysis of images received from the at least one camera and for controlling the at least one source of electromagnetic radiation in response to the performed analysis.

12. A LIDAR system according to claim 11, wherein the processor is adapted for monitoring alignment of the at least one source of electromagnetic radiation and the at least one detector.

13. A LIDAR system according to claim 11, wherein the processor is adapted for monitoring presence of humans proximate the electromagnetic radiation and turning the at least one source of electromagnetic radiation off to prevent inadvertent illumination of humans.

14. A LIDAR system according to claim 9, comprising a scanner that is arranged for moving the frame and thereby moving the measurement volume.

15. A LIDAR system according to claim 1, wherein the at least one source of electromagnetic radiation comprises a laser for emission of a beam of electromagnetic radiation and a beam shaper adapted for shaping the intensity profile of the beam into a desired beam profile.

16. A LIDAR system according to claim 1, comprising a calibrator arranged for placing an object with a known optical characteristic in the measurement volume.

17. A LIDAR system according to claim 16, wherein the processor is adapted to determine system reference data based on electromagnetic radiation received from the object in the measurement volume.

18. A LIDAR system according to claim 1, comprising a bandpass filter cooperating with the at least one detector for suppression of background signals and having a centre wavelength within the wavelength range of the at least one source of electromagnetic radiation.

19. A LIDAR system according to claim 1, wherein
the at least one source of electromagnetic radiation comprises at least two lasers for emission of electromagnetic radiation of respective at least two different centre wavelengths (w1, w2, . . . , wn) and wherein
the processor is adapted for
determination of intensities at the at least two wavelengths (w1, w2, . . . , wn) and for
comparison of the determined intensities with the set of reference data for different species, and for
generation of information on biological specificity of the insects based on the comparison.

20. A LIDAR system according to claim 19, wherein the emitted electromagnetic radiation at the at least two wavelengths (w1, w2, . . . , wn) are coinciding in the measurement volume.

21. A LIDAR system according to claim 1, wherein
the at least one source of electromagnetic radiation is arranged for emission of electromagnetic radiation of at least two different polarization states (p1, p2) and wherein
the processor is adapted for
determination of intensities at the at least two polarization states (p1, p2) and for
comparison of the determined intensities with the set of reference data for different species, and for
generation of information on biological specificity of the insects based on the comparison.

22. A LIDAR system according to claim 19, wherein the set of reference data comprises biological specificity parameters for at least two species, or more than three, or more than five, or more than ten, or more than 100, or more than 1000 species.

23. A LIDAR system according to claim 19, wherein the set of reference data comprises information of different species for one or more of the following parameters: melanin, wax, chitin, haemoglobin, microstructures of wings, periodicity and/or thickness of wings.

24. A LIDAR system according to claim 19, wherein the set of reference data comprises spectral differential absorption information of different species for one or more of the following parameters: melanin, wax, chitin, haemoglobin, microstructures of wings, periodicity and/or thickness of wings, and/or the set of reference data comprises polarization-dependent absorption and/or reflectance information of different species for one or more of the following parameters: melanin, wax, chitin, haemoglobin, microstructures of wings, periodicity and/or thickness of wings.

25. A LIDAR system according to claim 19, wherein the set of reference data is embedded within the processor.

26. A LIDAR system according to claim 1, wherein at least one of the at least one detector is arranged for detection of direction of movement of the insect through the measurement volume.

27. A LIDAR system according to claim 26, wherein at least one of the at least one detector of electromagnetic radiation is a quadrant detector.

28. A method of optimizing use of pesticides in agriculture, wherein said method comprises the steps of measuring one, two or more species of insects using a system according to claim 1, analyse data from a measurement and determine at least one of desired pesticide, spraying time, spraying schedule, and spraying amount.

29. A method according to claim 28, comprising use of a database comprising information on at least one of insects and pesticides for the determination of at least one of desired pesticide, spraying time, spraying schedule, and spraying amount.

30. A LIDAR system for analysing insects, comprising
at least one source of electromagnetic radiation that is adapted for emission of electromagnetic radiation towards a measurement volume for illumination of insects in the measurement volume,
at least one detector of electromagnetic radiation that is arranged for provision of at least one output signal in response to reception of electromagnetic radiation having interacted with the insects in the measurement volume, and
a processor having access to a set of reference data obtained from operating a LIDAR system for aerial fauna in an insectarium with predetermined species of insects, the reference data comprising data for at least two different species; wherein the processor is adapted for, based on the at least one output signal, detecting insects in the measurement volume, counting detected insects, and determining at least one parameter of the received electromagnetic radiation relating to the species of the insects comparing the determined at least one parameter with the set of reference data for different species, and generating information on biological specificity of the insects based on the comparison, wherein at least one first detector of the at least one detector of electromagnetic radiation is arranged for reception of electromagnetic radiation from the measurement volume from a first angle different from the direction of propagation of the electromagnetic radiation emitted by the at least one source of electromagnetic radiation, the LIDAR system further comprising an optical system arranged for cooperation with the at least one first detector in accordance with the Scheimpflug principle for reception of electromagnetic radiation from the measurement volume from the first angle.

* * * * *